(12) United States Patent
Gurtin et al.

(10) Patent No.: US 11,711,435 B2
(45) Date of Patent: *Jul. 25, 2023

(54) METHODS, APPARATUSES AND COMPUTER PROGRAM PRODUCTS FOR A GROUP-BASED COMMUNICATION SYSTEM INTERACTING WITH REMOTE RESOURCES FOR REMOTE DATA OBJECTS

(71) Applicant: Slack Technologies, LLC, San Francisco, CA (US)

(72) Inventors: Liza Gurtin, San Francisco, CA (US); Salman Suhail, San Francisco, CA (US); Michael Hahn, San Francisco, CA (US); Corey Baker, British Columbia (CA); Serry Park, Seattle, WA (US); Sachin Ranchod, San Rafael, CA (US); Brian Stephen O'Neill, Portsmouth, NH (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,457

(22) Filed: Oct. 4, 2021

(65) Prior Publication Data

US 2022/0030073 A1    Jan. 27, 2022

Related U.S. Application Data

(63) Continuation of application No. 16/519,603, filed on Jul. 23, 2019, now Pat. No. 11,140,228.

(Continued)

(51) Int. Cl.
*G06F 15/16* (2006.01)
*H04L 67/146* (2022.01)
(Continued)

(52) U.S. Cl.
CPC ............ *H04L 67/146* (2013.01); *H04L 51/08* (2013.01); *H04L 63/0807* (2013.01);
(Continued)

(58) Field of Classification Search
None
See application file for complete search history.

(56) References Cited

U.S. PATENT DOCUMENTS 9,529,520 B2 * 12/2016 Cha ...................... G06F 9/4416
2010/0333131 A1 * 12/2010 Parker .............. H04N 21/63345
725/63

(Continued)

OTHER PUBLICATIONS

"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Wing F Chan
*Assistant Examiner* — Andrew Woo
(74) *Attorney, Agent, or Firm* — Erise IP, P.A.

(57) ABSTRACT

Systems and methods provide managing of communication between a remote data object hosted by a remote resource and a group-based communication interface of a group-based communication system.

20 Claims, 15 Drawing Sheets

Related U.S. Application Data

(60) Provisional application No. 62/722,654, filed on Aug. 24, 2018.

(51) Int. Cl.
  *H04L 65/403* (2022.01)
  *H04L 9/40* (2022.01)
  *H04L 51/08* (2022.01)
  *H04L 67/561* (2022.01)
  *H04L 67/06* (2022.01)

(52) U.S. Cl.
  CPC .......... *H04L 65/403* (2013.01); *H04L 67/561* (2022.05); *H04L 67/06* (2013.01)

(56) References Cited

U.S. PATENT DOCUMENTS

2017/0228266 A1* 8/2017 Johansson ............. G06F 21/606
2018/0287982 A1 10/2018 Draeger et al.

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

900

METHODS, APPARATUSES AND COMPUTER PROGRAM PRODUCTS FOR A GROUP-BASED COMMUNICATION SYSTEM INTERACTING WITH REMOTE RESOURCES FOR REMOTE DATA OBJECTS

CROSS-REFERENCE TO RELATED APPLICATIONS

This patent application is a continuation application claiming priority benefit, with regard to all common subject matter, of U.S. patent application Ser. No. 16/519,603, filed Jul. 23, 2019, and entitled "METHODS, APPARATUSES AND COMPUTER PROGRAM PRODUCTS FOR A GROUP-BASED COMMUNICATION SYSTEM INTERACTING WITH REMOTE RESOURCES FOR REMOTE DATA OBJECTS" ("the '603 Application"). The '603 Application claims priority to U.S. Provisional Patent Application No. 62/722,654, filed Aug. 24, 2018, and entitled "METHODS, APPARATUSES AND COMPUTER PROGRAM PRODUCTS FOR A GROUP-BASED COMMUNICATION SYSTEM INTERACTING WITH REMOTE RESOURCES FOR REMOTE DATA OBJECTS." The identified earlier-filed patent applications are hereby incorporated by reference in their entirety into the present application.

BACKGROUND

Various methods, apparatuses, and systems are configured to provide integration techniques for applications and services. Applicant has identified many deficiencies and problems associated with existing methods, apparatuses, and systems. Through applied effort, ingenuity, and innovation, these identified deficiencies and problems have been solved by developing solutions that are in accordance with the embodiments of the present disclosure, many examples of which are described in detail herein.

BRIEF SUMMARY

In general, embodiments of the present disclosure provide methods, apparatuses, systems, computing devices, and/or the like that are configured for providing integration techniques for applications and services integrate with a group-based communication system. Such embodiments are adapted to provide a share application programming interface for integrating applications and services with the group-based communication system.

Embodiments of the present disclosure are directed to an apparatus for managing communication between a remote data object hosted by a remote resource and a group-based communication interface of a group-based communication system. In embodiments, the apparatus comprises at least one processor and at least one non-transitory memory including program code, the at least one non-transitory memory and the program code configured to, with the processor, cause the apparatus to at least perform functions described herein.

In embodiments, the apparatus is configured or caused to generate a share application programming interface that is configured for engagement by the remote resource. In embodiments, the apparatus is configured or caused to receive a remote data object share request comprising a remote data object identifier associated with the remote data object, a group identifier associated with the group-based communication interface, and a share location identifier. In embodiments, the apparatus is configured or caused to transmit, via the share application programming interface, a remote data object share notification to the remote resource, the remote data object share notification comprising the remote data object identifier. In embodiments, the apparatus is configured or caused to, in response to transmitting the remote data object share notification, receive from the remote resource, via the share application programming interface, remote data object metadata associated with the remote data object, and automatically render a remote data object graphical representation associated with the remote data object to a share location of the group-based communication interface. In embodiments, the share location is determined based on the share location identifier. In embodiments, the remote data object graphical representation is configured to facilitate user engagement of the remote data object.

In embodiments, the share location identifier comprises at least one of a group-based communication channel identifier or a direct message identifier.

In embodiments, the share location comprises at least one of a group-based communication channel associated with the group-based communication channel identifier or a direct message interface associated with the direct message identifier.

In embodiments, the remote data object comprises at least one of a file, a call object, a task object, an event object, a message object, a notification object, or a calendar object.

In embodiments, the remote data object share request further comprises a share user identifier.

In embodiments, the non-transitory memory and the program code are further configured to, with the processor, cause the apparatus to query local apparatus memory to identify locally stored data objects associated with the share user identifier, query remote resource memory to identify remotely stored data objects associated with the share user identifier, and render a user shared data object list to the group-based communication interface. In embodiments, the user shared data object list comprises data object graphical representations associated with the locally stored data objects and the remotely stored data objects.

In embodiments, the user shared object list is ordered based on access recency.

In embodiments, the user shared object list is ordered based on the share location identifier.

In embodiments, the remote data object metadata comprises a remote data object type identifier.

In embodiments, the non-transitory memory and the program code are further configured to, with the processor, cause the apparatus to query local apparatus memory to identify locally stored data objects associated with the remote data object type identifier, query remote resource memory to identify remotely stored data objects associated with the remote data object type identifier, and render a common object type list to the group-based communication interface. In embodiments, the common object type list comprises data object graphical representations associated with the locally stored data objects and the remotely stored data objects.

In embodiments, the common object type list is ordered based on access recency.

In embodiments, the common object type list is ordered based on the share location identifier.

In embodiments, the remote data object share notification, transmitted to the remote resource, comprises an authentication token authorizing the remote resource to communicate with the group-based communication system.

In embodiments, the non-transitory memory and the program code are further configured to, with the processor, cause the apparatus to facilitate the user engagement of the remote data object in response to the remote resource validating the authentication token.

In some embodiments, the non-transitory memory and the program code are further configured to, with the processor, cause the apparatus to receive a remote preview request for the remote data object; transmit a remote metadata request for the remote data object to the remote resource; receive, from the remote resource, remote preview metadata for the remote data object, generate, based on the remote preview metadata, a remote preview, and automatically render the remote preview in response to the remote preview request. In some of those embodiments, the remote preview metadata for the remote data object comprises remote preview markup data for the remote preview and/or one or more access control parameters for the remote data object.

In some embodiments, determining the remote data object identifier comprises: identifying a remote resource identifier for the remote data object; determining, based on the remote resource identifier and a remote correlation table, a local identifier for the remote object; and determining the remote data object identifier based on the local identifier.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
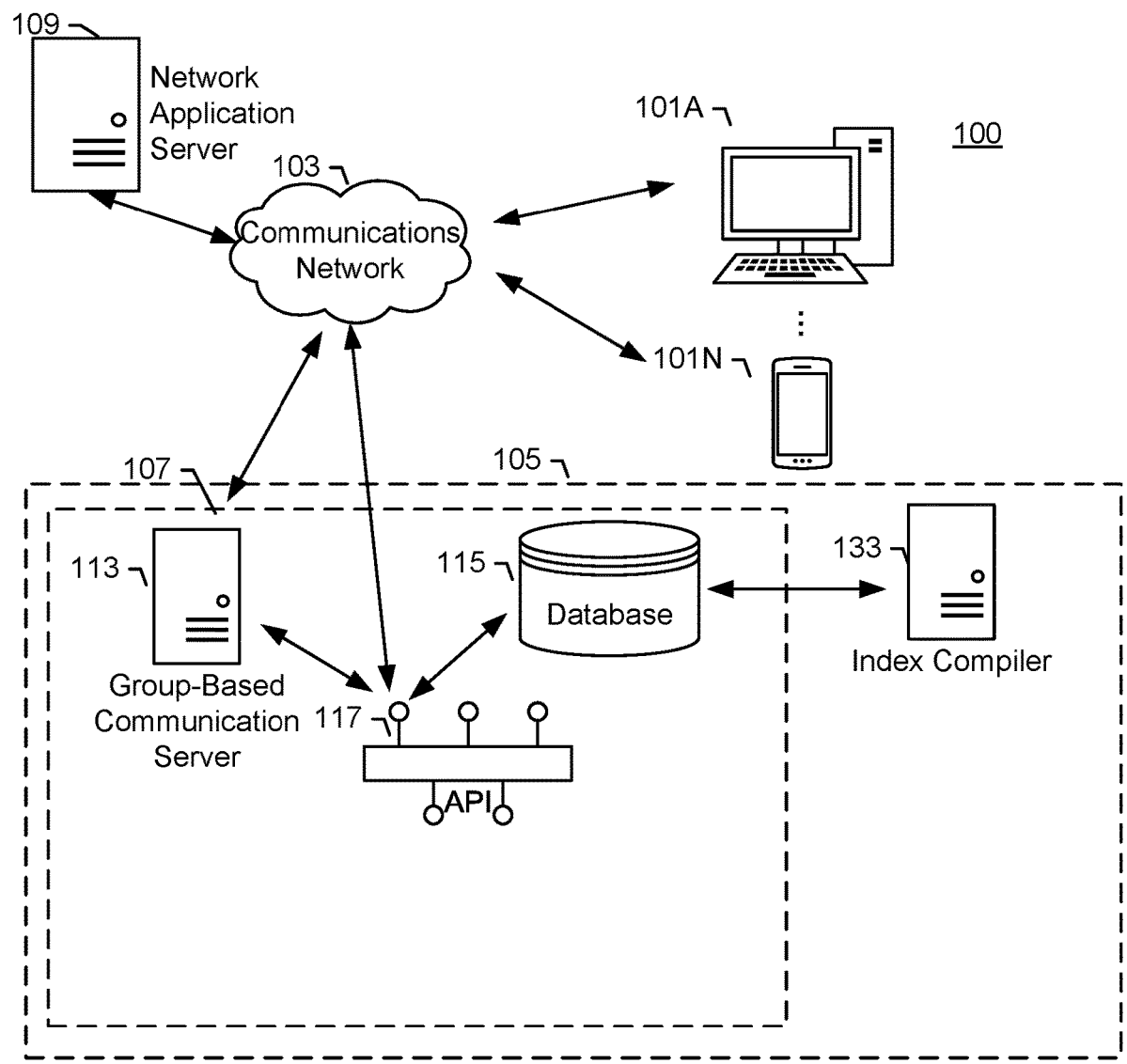
FIG. 1 is an example system infrastructure diagram of a group-based communication system in accordance with some exemplary embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure relate generally to integrating applications and/or services with a group-based communication system. Applicant has identified that some existing techniques for integrating applications and services with systems involve usage of iframes (inline frames). An iframe is a Hypertext Markup Language (HTML) document that may be embedded in a website and may provide content from a remote resource (e.g., a third party application(s) or service(s)) into the website. In this manner, a website provided by a system may be integrated with other sources to communicate/exchange content.

Applicant has identified that conserving memory space in memory devices as well as minimizing latency is important to improving any implementation of a group-based communication system. Solutions that increase latency and constrain memory capacity may cause an undue burden on computational resources, which may negatively impact computing efficiency causing a slowdown or resource drain (e.g., diminishing bandwidth) on a network.

Applicant has determined that there are technical drawbacks with using iframes to communicate content from content sources to a website of a system. For instance, when an iframe is loaded, scripts on the iframed webpage of a website may increase load time and consume network resources resulting in increased user interface latency. Additionally, the number of connections to a web server is generally shared between the webpage and the iframe, which constrains the connections and typically causes the user interface, loading the webpage, to load slower. Furthermore, iframes are typically large in memory, and given the large memory consumption, iframes typically increase network latency and may constrain network resources (e.g., processing capacity, bandwidth) to process the iframes.

Example embodiments may utilize a specifically configured share application programming interface (API) to integrate remote sources of content (e.g., applications, services, etc.) with a group-based communication system. By utilizing this specifically configured share API, the exemplary embodiments may identify relevant remote data objects (e.g., requested files, calls (e.g., telephone calls), event data, calendar data, etc.) of remote resources (e.g., e.g., third party applications, services, etc.) associated with the group-based communication system without having to search through inordinate amounts of data since the relevant remote data objects may be indexed in storage of a remote resource(s) that may be identifiable within a message (e.g., the remote resource may be identifiable from a link (e.g., a uniform resource locator (URL)) within the message) of the group-based communication system. By minimizing query latency associated with not searching through inordinate amounts of data of the remote resources for relevant remote data objects, the exemplary embodiments may also conserve network resources (e.g., processing capacity, bandwidth).

Additionally, by loading, to a user interface, relevant requested information (e.g., a requested file associated with a registered user) associated with an application or service that is linked to the group-based communication system as opposed to other data such as for example scripts, etc. for iframes, the specifically configured share API of the exemplary embodiments may render faster and enable the exemplary embodiments to load user interfaces faster than systems that utilize iframes.

As such, systems structured in accordance with various embodiments of the disclosure provide specific, technical solutions to technical problems faced by some systems.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third party resources.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an graphical representation, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like. In one embodiment, the group identifier associated with member users of a Slack Corporation workspace (i.e., a group-based communication interface) is 104356721.

The term "remote resource" refers to a software program, application, platform, or service that is configured to communicate with the group-based communication system for providing service to a client device via a group-based communication interface. The remote resource operates on a compiled code base or repository that is separate and distinct from that which supports the group-based communication system. In some embodiments, the remote resource may communicate with the group-based communication system, and vice versa, through one or more application program interfaces (APIs). In some embodiments, the remote resource receives tokens or other authentication credentials that are used to facilitate secure communication between the remote resource and the group-based communication system in view of group-based communication system network security layers or protocols (e.g., network firewall protocols).

The terms "remote data object" or "remotely stored data object" refer to a file(s), a call object(s), a task(s), an event object(s), a message or message object(s), a notification or notification object(s), or a calendar object(s) that is stored to a memory or database associated with the remote resource but which may be shared to one or more group-based interfaces of the group-based communication system. In some embodiments, the remote data object is stored to a remote data object address, which may be a uniform resource locator (URL), an Internet address, or an intranet domain.

The term "locally stored data objects" refers to a file(s), a call object(s), a task(s), an event object(s), or a calendar object(s) that is stored to a memory or database associated with the group-based communication system.

The term "local apparatus memory" refers to the memory or database associated with the group-based communication system storing the locally stored data objects.

The term "remote resource memory" refers to the memory or database associated with the remote resource storing the remotely stored data objects.

The term "share application programming interface" (share API) refers to a set of routines, protocols, and software system tools that facilitate sharing of remote data objects among and between the group-based communication system and one or more remote resources. In various embodiments, the share API defines the protocol and procedural steps by which a remote resource may make its remote data objects available for sharing by users within a group-based communication interface of a group-based communication system. The share API further defines the security and authentication protocols that govern communications between the remote resource and the group-based communication system The term "remote data object graphical representation" refers to a graphical representation (e.g., an image file), icon, logo, tombstone, figure or the like that represents a remote data object and is rendered within a group-based communication interface. In various embodiments, the remote data object graphical representation embodies a user engagable link that is configured to allow a user to interact with or update an associated remote data object of the remote resource. In various embodiments, the remote data object graphical representation is rendered based at least in part on remote data object metadata received from a remote resource.

The term "data object graphical representations" refers to graphical representations (e.g., image files), icons, logos, tombstones, figures or the like that represent remote data objects or locally stored data objects and which are rendered within a user shared data object list or a common object type list to the group-based communication interface.

The term "share location identifier" is an indication or address for the intended position of remote data object within a group-based communication interface that is readable by a group-based communication system. In various embodiments, the share location identifier comprises ASCII text, a pointer, a memory address, and the like. In some embodiments, the share location identifier includes a group-based communication channel identifier or a direct message (DM) identifier.

The term "remote data object metadata" refers to a data set that describes an associated remote data object. The remote data object metadata is transmitted by the remote resource to a group-based communication system to enable sharing of the remote data object within the group-based communication interface of the group-based communication system. Example remote data object metadata includes a remote resource identifier, a remote data object graphical representation, a remote data object identifier, a remote data object type identifier, a remote data object address, a remote data object author identifier, a remote data object recipient identifier, a share location identifier, a remote data object creation timestamp, a remote data object access timestamp, and the like.

The term "share location" refers to a position of a group-based communication interface that is designated by a share location identifier and thereby intended to receive a shared remote data object. Example share locations include a group-based communication channel and a direct message interface.

The term "remote data object share request" refers to a message generated by a client device (or application running on a client device) and transmitted to a group-based communication system that includes instructions to share a remote data object to a group-based communication interface. Example remote data object share requests may include data sets comprising a remote data object identifier, a remote resource identifier, a group identifier, a share location identifier, a share user identifier, a share timestamp, and the like.

The term "remote data object identifier" refers to one or more items of data that enable identification of a remote data object. In example embodiments, the remote data object identifier comprises ASCII text, a pointer, a memory address, and the like. In some embodiments, the remote data object identifier includes remote data object version information.

The term "remote resource identifier" is a remote data object identifier assigned to a remote data object by a remote resource associated with the remote data object. For example, the remote resource identifier for a document remote data object may be a document identifier assigned to the document remote data object by a remote resource that stores the document remote data object.

The term "local identifier" is a remote data object identifier assigned to a remote data object by the group-based communication system. For example, the remote resource identifier for a document remote data object may be a document identifier assigned to the document remote data object by the group-based communication system.

The term "remote correlation table" is a structured collection of one or more items of data that store a remote resource identifier for a remote data object and a local identifier for the remote data object as part of the same remote correlation table entry. In some embodiments, the remote data object identifier is a primary key for the remote correlation table. In some embodiments, the local identifier for the remote data object is not a primary key for the remote correlation table. The remote correlation table may be a table in a relational database (e.g., a SQL database) and/or a file in a structured-file-based database (e.g., a JSON database).

The term "local correlation table" is a structured collection of one or more items of data that store a local identifier for the remote data object and one or more remote data object metadata entries for the remote data object as part of the same local correlation table entry. In some embodiments, the local identifier is a primary key for the local correlation table. The local correlation table may be a table in a relational database (e.g., a SQL database) and/or a file in a structured-file-based database (e.g., a JSON database).

The term "remote data object share notification" refers to a message generated by a group-based communication system and transmitted to a remote resource(s) that enables sharing of remote data object of the remote resource to a group-based communication interface of the group-based communication system. Example remote data object share notifications include a remote data object identifier and a share timestamp. In some embodiments, the remote data object share notification may comprise a share user identifier, a share location identifier, an authentication token, and the like.

A "share user identifier" refers to one or more items of data that enable identification of a group-based communication user that has initiated sharing of a remote data object to a group-based communication interface. In various embodiments, the share user identifier comprises ASCII text, a pointer, a memory address, and the like.

The term "user shared data object list" refers to a list of data object graphical representations associated with locally stored data objects and remotely stored data objects that are shared by a group-based communication user associated with a share user identifier. The user shared data object list may include data object graphical representations associated with files, call objects, tasks, event objects and calendar objects shared by the group-based communication user associated with the share user identifier.

The term "common object type list" refers to a list of data object graphical representations associated with locally stored data objects and remotely stored data objects that are associated with a remote data object type identifier (e.g., a file type identifier, a call object type identifier, a task type identifier, an event type identifier, a colander type identifier). In some example embodiments, the common object type list may include data object graphical representations associated with only files, only call objects, only tasks, only event objects or only calendar objects based on a respective remote data object type identifier.

The term "access recency" refers to a recency (i.e., a most recent time proximity) in which the locally stored data objects and the remotely stored data objects were shared by a group-based communication user associated with a share user identifier or a recency in which the locally stored data objects associated with a remote data object type identifier were accessed in the group-based communication system and the remotely stored data objects associated with the remote data object type identifier were accessed in the remote resource.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "remote preview" for a remote data object refers to a combination of user interface elements that provide information about the remote data object without performing a complete transition from a user interface within which a remote preview request for the remote preview is generated. For example, the remote preview for a remote data object may include one or more remote data object metadata information for the remote data object. As another example, the remote data preview for a remote data object may include a portion of contents of the remote data object (e.g., in an image form). In some embodiments, a remote data object having two or more sets of co-displayable user interface elements may have interactive components that enable transition between one set of co-displayable user interface elements to another set of co-displayable user interface elements.

The term "remote preview markup data" refers to one or more items of data configured to describe at least one aspect of mark-up language code of a remote preview. For example, the remote preview markup data may include hyper-text transfer protocol for a particular remote preview. As another example, the remote preview markup data may include image data for a particular remote preview.

The term "remote preview request" refers one or more items of data configured to indicate a request for generating and displaying a remote preview for a remote data object. For example, a remote preview request for a remote data object may be generated based on one or more actions by an end user profile of the group-based communication system configured to request a remote preview for the remote data object. Examples of suitable actions may include hovering a pointer over a remote data object graphical representation for the remote data object, pressing a key combination configured to request a remote preview for the remote data object, performing a touch pattern (e.g., a two-finger expansion touch pattern and/or a two-finger minimization touch pattern) configured to request a remote preview for the remote data object, performing a right click over a remote data object graphical representation for the remote data object, etc.

The term "remote preview metadata" refers to one or more items of data stored on a remote server associated with a remote data object which contain information relevant to generating a remote preview for the remote data object. In some embodiments, the remote preview metadata may include at least one of one or more access security policies for the remote data object, an interactive preview of the remote data object, an indexed version of the remote data object, etc. For example, the remote resource may identify that particular portions of the remote data object are access-restricted and generate, as at least a part of the remote preview metadata, an interactive preview of the remote data object that does not include such particular portions. In some embodiments, the remote preview metadata may indicate that no preview-related information are available for the remote data object.

The term "local preview metadata" refers to one or more items of data stored on a group-based communication system which contain information relevant to generating a remote preview for the remote data object. In some embodiments, the remote object metadata for the remote data object includes information (e.g., an indexed version of the remote data object) that can be used to generate the remote preview of the remote data object.

The term "remote metadata request" refers one or more items of data configured to request transmission of remote preview metadata for a remote data object from a remote resource associated with the remote data object. For example, a remote metadata request may be transmitted from a group-based communication server to a remote resource associated with the remote data object.

The term "remote object access request" refers to one or more items of data configured to request obtaining and/or modifying one or more items of data associated with a remote data object. In some embodiments, the remote object access request is a request to search information (e.g., remote object metadata information) associated with the remote data object. In some embodiments, the remote data object request is a request to view contents of the remote data object. In some embodiments, the remote data object request is a request to modify contents of the remote data object. In some embodiments, the remote data object request is a request to delete the remote data object. In some embodiments, the remote data object request is a request to change a property (e.g., an access restriction parameter, an address, etc.) of the remote data object.

The term "access control parameter" refers to one or more items of data configured to describe which user profiles are allowed to perform particular actions with respect to a remote data object. For example, a particular access control parameter for a remote data object may indicate that only a particular category of users has the right to modify particular contents of a particular remote data object. As another example, a particular access control parameter for a remote data object may indicate that only a particular category of users has the right to view particular contents of a particular remote data object. As a further example, a particular access control parameter for a remote data object may indicate that only a particular category of users has the right to modify a particular property (e.g., an access control parameter) of a particular remote data object.

"The term "automatically rendering" refers to one or more operations configured to cause one or more computing devices (e.g., one or more client devices) to render one or more user interfaces. For example, to automatically render a particular user interface, a group-based communication server may cause one or more client devices of a corresponding group-based communication system to render the particular user interface (e.g., by way of transmitting instructions for rendering a user interface to the client device).

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. Users may access a group-based communication system 105 via a communications network 103 using client devices 101A-101N.

The client devices 101A-101N may be any computing device as defined above. Electronic data received by group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device of client devices 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client device of client devices 101A-101N may interact with the group-based communication system 105 via a web browser. As yet another example, the client device of client devices 101A-101N may include various hardware or firmware designed to interface with the group-based communication system 105.

Communications network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 103 may include a cellular telephone, an 802.11, 802.16, 802.20, and/or WiMax network. Further, the communications network 103 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

In some embodiments, the online data management system 107 comprises a group-based communication server 113, one or more databases 115, and an Application Programming Interface (API) component 117.

The group-based communication server 113 may be embodied as a computer or computers. The group-based communication server 113 may provide for receiving of electronic data from various sources, including but not limited to the client devices 101A-101N. For example, the group-based communication server 113 may be operable to receive and post or transmit group-based messaging communications provided by the client devices 101A-101N via communications network 103.

The API component 117 may be embodied in one or more computers or computing apparatus, such as a server or servers. The API component 117 may be a set of routines, protocols and software system tools that facilitate the data transmission among and between various components of the group-based communication system 105. For example, the API component 117 may receive queries from client devices 101A-101N via the communications network 103. It may also receive data from and transmit data to the group-based communication server 113. The API component 117 may also transmit data to the one or more databases 115.

Further, the API component 117 provides routines that allow a client to search for messages or message metadata. For example, the search.messages API component has a "query" field and performs a search given that query. It also allows for search of message metadata (for example, has: reaction or has:star, from:john). The API component 117 also provides an interface to integrate remote resources with the group-based communication system 105 for the communication/exchange of information associated with remote data objects.

The network application server 109 may interact with the API component 117 and one or more other APIs (e.g., API circuitry 212 of FIG. 2) for the communication/exchange of information associated with remote data objects. In some embodiments, the network application server 109 is a remote resource provider for one or more remote resource objects. Examples of network application servers 109 include file storage platforms, such as cloud file storage platforms (e.g., Google Drive, Dropbox, Box, etc.). Further examples of network application servers 109 include application resource platforms, such as calendar providers, email providers, or other resource platforms (e.g., Workday, Asana, Jira, and the like). While the exemplary system architecture 100 depicted in FIG. 1 depicts a single network application server 109, it will be appreciated that the system architecture 100 may include any number of network application servers 109.

The one or more databases 115 may be embodied as a data storage device(s) such as a Network Attached Storage (NAS) device or devices, or as a separate database server or servers. In some embodiments, the one or more databases 115 are relational database(s), such as MySQL database(s). The one or more databases 115 include information accessed and stored by the group-based communication server 113 and transmitted from API component 117, and facilitate the operations of the group-based communication server 113. For example, the one or more databases 115 may include, without limitation, a plurality of messaging communications organized among a plurality of group-based communication channels, and/or the like.

In this regard, the one or more databases 115 may serve as the primary data storage of the group-based communication system 105. As described hereinafter, the one or more databases 115 store backups (snapshots) of the data storage, and make these backups available for index generation processes.

The index compiler 133 may process the metadata and/or contents of the message to index the message (e.g., using the conversation primitive as described below) and facilitate various facets of searching (i.e., search queries that return results from the group-based communication system 105). In one example embodiment, the message may be indexed such that a company's or a group's messages are indexed separately (e.g., in a separate index associated with the group and/or company that is not shared with other groups and/or companies). In another example embodiment, messages may be indexed at a separate distributed repository (e.g., to facilitate data isolation for security purposes).

An example of electronic information exchange among one or more client devices 101A-101N and the group-based communication system 105 is described below.

In some embodiments of an example group-based communication system 105, a message or messaging communication may be sent from a client device of client devices 101A-101N to a group-based communication system 105. In various implementations, the message may be sent to the group-based communication system 105 over communications network 103 directly by a client device of client devices 101A-101N. The message may be sent to the group-based communication system 105 via one or more intermediaries, such as group-based communication server 113, and/or the like. For example, client devices 101A-101N may be a desktop, a laptop, a tablet, a smartphone, and/or the like that is executing a client application (e.g., a group-based communication app).

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including Extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
      <user_account_credentials>
        <user_name>ID_user_1</user_name>
        <password>abc123</password>
        //OPTIONAL <cookie>cookieID</cookie>
        //OPTIONAL
<digital_cert_link>www.mydigitalcertificate.com/
JohnDoeDaDoeDoe@gmail.com/mycertifcate.dc</digital_cert_link>
        //OPTIONAL
<digital_certificate>_DATA_</digital_certificate>
      </user_account_credentials>
    </user_accounts_details>
    <client_details> //iOS Client with App and Webkit
       //it should be noted that although several
client details
       //sections are provided to show example
variants of client
       //sources, further messages will include only
on to save
       //space
      <client_IP>10.0.0.123</client_IP>
      <user_agent_string>Mozilla/5.0 (iPhone; CPU
iPhone OS 7_1_1 like Mac OS X) AppleWebKit/537.51.2 (KHTML,
like Gecko) Version/7.0 Mobile/11D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXX
XD</client_UDID>
      <client_OS>iOS</client_OS>
      <client_OS_version>7.1.1</client_OS_version>
      <client_app_type>app with
webkit</client_app_type>
      <app_installed_flag>true</app_installed_flag>
      <app_name>MSM.app</app_name>
      <app_version>1.0 </app_version>
      <app_webkit_name>Mobile
Safari</client_webkit_name>
      <client_version>537.51.2</client_version>
    </client_details>
    <client_details> //iOS Client with Webbrowser
      <client_IP>10.0.0.123</client_IP>
      <user_agent_string>Mozilla/5.0 (iPhone; CPU
iPhone OS 7_1_1 like Mac OS X) AppleWebKit/537.51.2 (KHTML,
like Gecko) Version/7.0 Mobile/11D201
Safari/9537.53</user_agent string>
      <client_product_type>iPhone6,1</client_product_type>
      <client_serial_number>DNXXX1X1XXXX</client_serial_number>
      <client_UDID>3XXXXXXXXXXXXXXXXXXXXXX
XD</client_UDID>
      <client_OS>iOS</client_OS>
      <client_OS_version>7.1.1</client_OS_version>
      <client_app_type>web browser</client_app_type>
      <client_name>Mobile Safari</client_name>
      <client_version>9537.53</client_version>
    </client_details>
    <client_details> //Android Client with Webbrowser
      <client_IP>10.0.0.123</client_IP>
      <user_agent_string>Mozilla/5.0 (Linux; U; Android
4.0.4; en-us; Nexus S Build/IMM76D) AppleWebKit/534.30
(KHTML, like Gecko) Version/4.0 Mobile
Safari/534.30</user_agent_string>
      <client_product_type>Nexus
S</client_product_type>
      <client_serial_number>YXXXXXXXXZ</client_serial_number>
      <client UDID>FXXXXXXXX-XXXX-XXXX-
XXXX-XXXXXXXXXXXX</client_UDID>
      <client_OS>Android</client_OS>
      <client_OS_version>4.0.4</client_OS_version>
      <client_app_type>web browser</client_app_type>
      <client name>Mobile Safari</client_name>
      <client version>534.30</client_version>
    </client_details>
    <client_details> //Mac Desktop with Webbrowser
      <client_IP>10.0.0.123</client_IP>
      <user_agent_string>Mozilla/5.0 (Macintosh; Intel
Mac OS X 10_9_3) AppleWebKit/537.75.14 (KHTML, like Gecko)
Version/7.0.3 Safari/537.75.14</user_agent_string>
      <client_product_type>MacPro5,1</client_product_type>
      <client_serial_number>YXXXXXXXXZ</client_serial_number>
      <client UDID>FXXXXXXXX-XXXX-XXXX-
XXXX-XXXXXXXXXXXX</client_UDID>
      <client_OS>Mac OS X</client_OS>
      <client_OS_version>10.9.3</client_OS_version>
      <client_app_type>web browser</client_app_type>
      <client_name>Mobile Safari</client_name>
      <client_version>537.75.14</client_version>
    </client_details>
    <message>
      <message_identifier>ID_message_10</message_identifier>
      <team_identifier>ID team_1</team_identifier>
      <channel_identifier>ID_channel_1</channel_identifier>
      <contents>That is an interesting invention. I have
attached a copy our patent policy.</contents>
      <attachments>patent_policy.pdf</attachments>
    </message>
</auth_request>
```

The group-based communication system 105 comprises at least one group-based communication server 113 that may create a storage message based upon the received message to facilitate message storage in one or more databases 115. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 113 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
      <topic>inventions</topic>
      <topic>patents</topic>
      <topic>policies</topic>
    </topics>
    <responses>
      <response>liked by ID_user_2</response>
      <response>starred by ID_user_3</response>
    </responses>
    <contents>That is an interesting invention. I have attached a
copy our patent policy.</contents>
    <attachments>patent_policy.pdf</attachments>
    <conversation_primitive>
    conversation includes messages: ID_message_8,
ID_message_9, ID_message 10,
```

```
ID_message_11, ID_message_12
  </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using Pre Hypertext Processor (PHP) commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

As described further hereinafter, the above MySQL database command may be modified and used to generate documents for live or computed indexing (via MySQL queries for live indexing in the API component 117.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, third party application(s), service(s), group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages).

In some embodiments, various metadata (determined as described above) and the contents of the message are transmitted from the client devices 101A-101N to the group-based communication system 105 via the communications network 103.

Upon receiving electronic message data from the client devices 101A-101N via communications network 103, the group-based communication server 113 processes and prioritizes electronic message data. The group-based communication server 113 provides persistent broadcast of electronic messages to the client devices 101A-101N connected to the group-based communication system 105 via the communications network 103. For example, when a user John sends an electronic message in a group-based communication channel using a client device, the group-based communication server 113 broadcasts this electronic message to other client devices associated with the same group-based communication channel. In this regard, the group-based communication server 113 serves as a message amplifier.

The group-based communication server 113 also communicates with the API component 117 to initiate the process of writing electronic message data into the one or more databases 115.

Example Apparatuses Utilized with Various Embodiments

Figure 2:
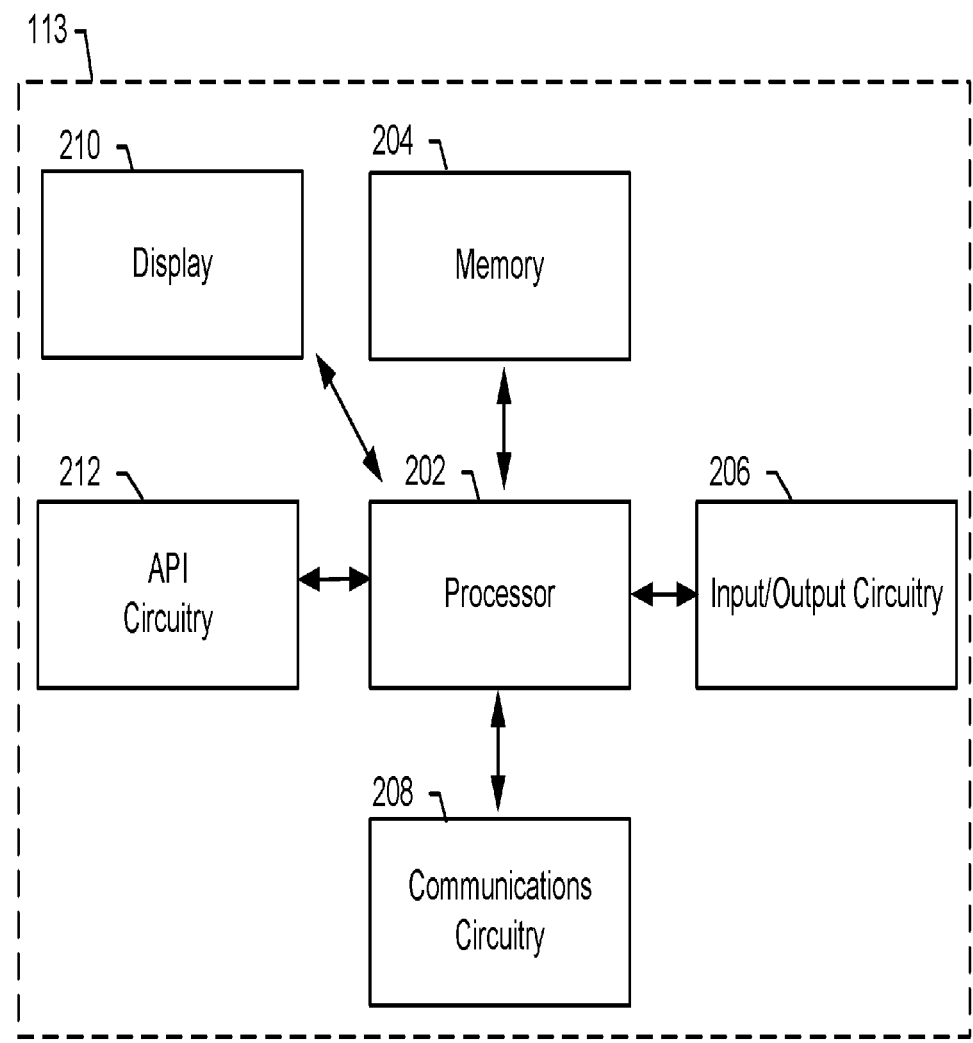
FIG. 2 is a diagram of an apparatus of a group-based communication server in accordance with some exemplary embodiments of the present disclosure.

The group-based communication server 113 may be embodied by one or more computing systems, such as apparatus 200 shown in FIG. 2. The apparatus 200 may include processor 202, memory 204, input/output circuitry 206, communications circuitry 208, display 210 and API circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The API circuitry 212 (also referred to herein as share API circuitry 212) may include hardware and/or software including a set of routines, protocols and software system tools that facilitate data transmission among and between various components of the group-based communication system 105 as well as other remote resources, as described more fully below. The API circuitry 212 may include an interface to integrate the group-based communication system 105 with other remote resources to exchange/communicate information. The API circuitry 212 may utilize processing circuitry, such as the processor 202, to perform these actions. However, it should also be appreciated that, in some embodiments, the API circuitry 212 may include a separate processor, specially configured Field Programmable Gate Array (FPGA), or Application Specific Integrated Circuit (ASIC) for performing the functions described herein. The API circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
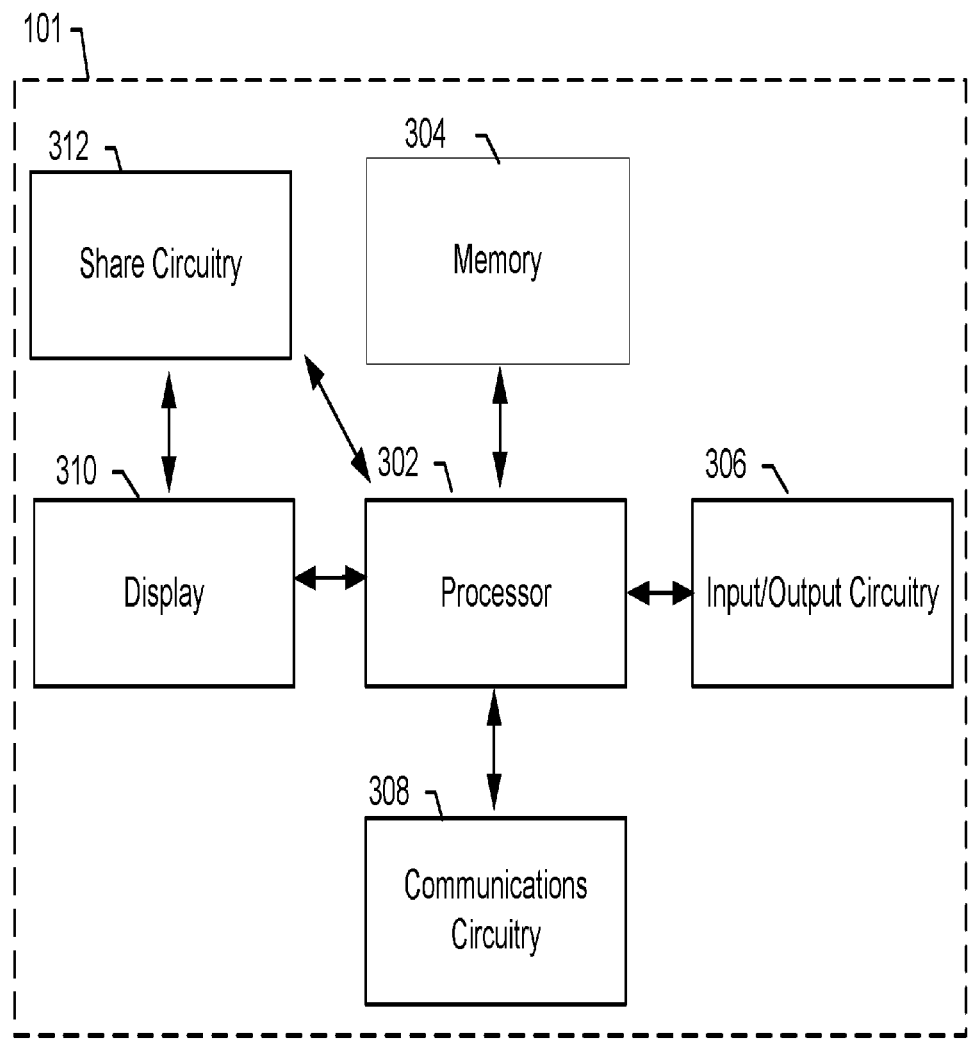
FIG. 3 is a diagram of an apparatus of a client device in accordance with some exemplary embodiments of the present disclosure.

Referring now to FIG. 3, a client device(s) 101 (e.g., client devices 101A-101N) may be embodied by one or more computing systems, such as apparatus 300 shown in FIG. 3. The apparatus 300 may include processor 302, memory 304, input/output circuitry 306, communications circuitry 308, display 310 and share circuitry 312. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a client device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The share circuitry 312 includes hardware configured to receive information associated with remote data objects (e.g., files, tasks, calls, event data, calendar data, etc.) from one or more remote resources, as described more fully below.

The share circuitry 312 may utilize processing circuitry, such as the processor 302, to perform these actions. However, it should also be appreciated that, in some embodiments, the share circuitry 312 may include a separate processor, specially a configured Field Programmable Gate Array (FPGA), or Application Specific Integrated Circuit (ASIC) for performing the functions described herein. The share circuitry 312 may be implemented using hardware components of the apparatus configured by either hardware or software for implementing these planned functions.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Figure 4:
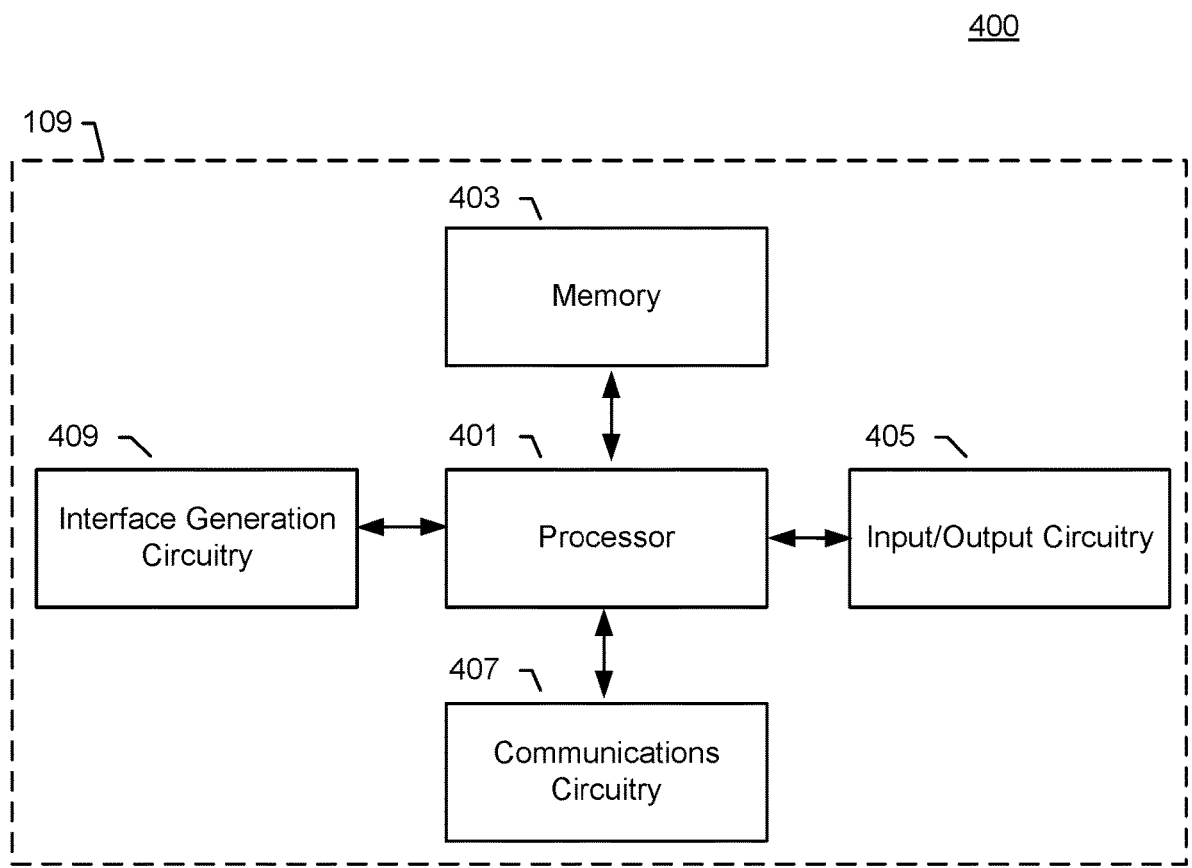
FIG. 4 is a diagram of an apparatus of a network application server in accordance with some exemplary embodiments of the present disclosure.
Figure 5:
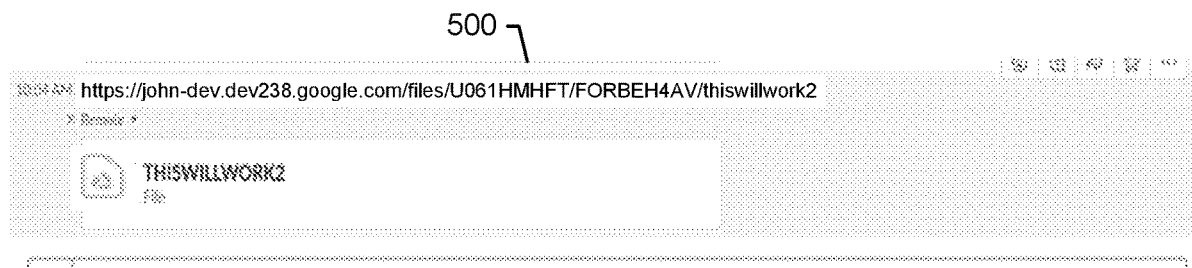
FIGS. 5-9 are diagrams of example user interfaces in accordance with some exemplary embodiments of the present disclosure.

The network application server 109 may be embodied by one or more computing systems, such as apparatus 400 shown in FIG. 4. The apparatus 400 may include processor 401, memory 403, input/output circuitry 405, communications circuitry 407, and interface generation circuitry 409. Although these components 401-409 are described with respect to functional limitations, it should be understood that the particular implementations necessarily include the use of particular hardware. It should also be understood that certain of these components 401-409 may include similar or common hardware. For example, two sets of circuitries may both leverage use of the same processor, network interface, storage medium, or the like to perform their associated functions, such that duplicate hardware is not required for each set of circuitries.

In some embodiments, the processor 401 (and/or co-processor or any other processing circuitry assisting or otherwise associated with the processor) may be in communication with the memory 403 via a bus for passing information among components of the apparatus. The memory 403 is non-transitory and may include, for example, one or more volatile and/or non-volatile memories. In other words, for example, the memory 403 may be an electronic storage device (e.g., a computer-readable storage medium). The memory 403 may be configured to store information, data, content, applications, instructions, or the like for enabling the apparatus 400 to carry out various functions in accordance with example embodiments of the present disclosure.

The processor 401 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 401 may be configured to execute instructions stored in the memory 403 or otherwise accessible to the processor 401. In some preferred and non-limiting embodiments, the processor 401 may be configured to execute hard-coded functionalities. As such, whether configured by hardware or software methods, or by a combination thereof, the processor 401 may represent an entity (e.g., physically embodied in circuitry) capable of performing operations according to an embodiment of the present disclosure while configured accordingly. Alternatively, as another example, when the processor 401 is embodied as an executor of software instructions, the instructions may specifically configure the processor 401 to perform the algorithms and/or operations described herein when the instructions are executed.

In some embodiments, the apparatus 400 may include input/output circuitry 405 that may, in turn, be in communication with processor 401 to provide output to the user and, in some embodiments, to receive an indication of a user input. The input/output circuitry 405 may comprise a user interface and may include a display, and may comprise a web user interface, a mobile application, a client device, a kiosk, or the like. In some embodiments, the input/output circuitry 405 may also include a keyboard, a mouse, a joystick, a touch screen, touch areas, soft keys, a microphone, a speaker, or other input/output mechanisms.

The communications circuitry 407 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 407 may include, for example, a network interface for enabling communications with a wired or wireless communication network. For example, the communications circuitry 407 may include one or more network interface cards, antennae, buses, switches, routers, modems, and supporting hardware and/or software, or any other device suitable for enabling communications via a network. Additionally or alternatively, the communications circuitry 407 may include the circuitry for interacting with the antenna/antennae to cause transmission of signals via the antenna/antennae or to handle receipt of signals received via the antenna/antennae.

The interface generation circuitry 409 includes hardware configured to generate communication channel interfaces for interacting with the API component 117 and/or the share API 212. The interface generation circuitry 409 may utilize processing circuitry, such as the processor 401, to perform these actions. However, it should also be appreciated that, in some embodiments, the interface generation circuitry 409 may include a separate processor, specially configured Field Programmable Gate Array (FPGA), or Application Specific Integrated Circuit (ASIC) for performing the functions described herein. The interface generation circuitry 409 may be implemented using hardware components of the apparatus configured by either hardware or software for implementing these planned functions.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 302 may provide processing functionality, the memory 304 may provide storage functionality, the communications circuitry 308 may provide network interface functionality, and the like. Additionally, other elements of the apparatus 400 may provide or supplement the functionality of particular circuitry. For example, the processor 401 may provide processing functionality, the memory 403 may provide storage functionality, the communications circuitry 407 may provide network interface functionality, and the like.

As will be appreciated, any such computer program instructions (e.g., program code instructions) and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

As mentioned, various exemplary embodiments facilitate integration of one or more remote resources with a group-based communication system for exchange/communication of information (e.g., information associated with remote data objects).

In some exemplary embodiments, the share API 212 may facilitate communications between the group-based communication system 105 and one or more remote resources for data associated with remote data objects such as, for example, files, tasks, calls, calendars, and/or events of remote resources. The remote data objects may be stored in a remote resource memory (e.g., memory 403) of a remote resource. For purposes of illustration and not of limitation, consider an example in which the share API 212 facilitates communications between the group-based communication system 105 and remote resources for data associated with remote data objects such as, for example, files.

In this example, consider that a client device (e.g., client device 101) of a user of a group-based communication channel posts a message including a link (e.g., a URL for a file (e.g., a Google Drive™ file)) of a remote resource (e.g., Google Drive™), to other users of the group-based communication channel. In this regard, the group-based communication server 113 may automatically analyze the link and identity the remote resource associated with the link (e.g., Google Drive™). The group-based communication server 113, may identify the remote resource based on a server domain name (e.g., google.com) in the link of the message. Also, consider that this file is stored remotely (e.g., in a remote resource memory (e.g., memory 403) of the remote resource. The group-based communication server 113 may send a request to the remote resource for data associated with the file. In response to receipt of the request for the file, a communication device (e.g., apparatus 400) of the remote resource may interact with the share API 212 (e.g., via interface generation circuitry 409) and call a resource.remote.add function API of the share API 212 to retrieve data associated with the file.

In response to executing the resource.remote.add function API, the communication device (e.g., apparatus 400) of the remote resource also may identify the name of the file (e.g., file name "THISWILLWORK2"), generate a remote data object graphical representation of the file as well as generate remote data object metadata about the file including, but not limited to, the size of the file, a file type identifier, and a file type associated with the file. The communication device (e.g., apparatus 400) of the remote resource may also add the remote data object graphical representation to the group-based communication system 105 by, for example, sending or uploading the remote data object graphical representation along with the name of the file, and the remote data object metadata associated with the file to the group-based communication server 113 The group-based communication server 113 may store and index the remote data object metadata and data associated with the remote data object graphical representation, in a memory device (e.g., memory 204), based in part on the file name.

Figure 6:
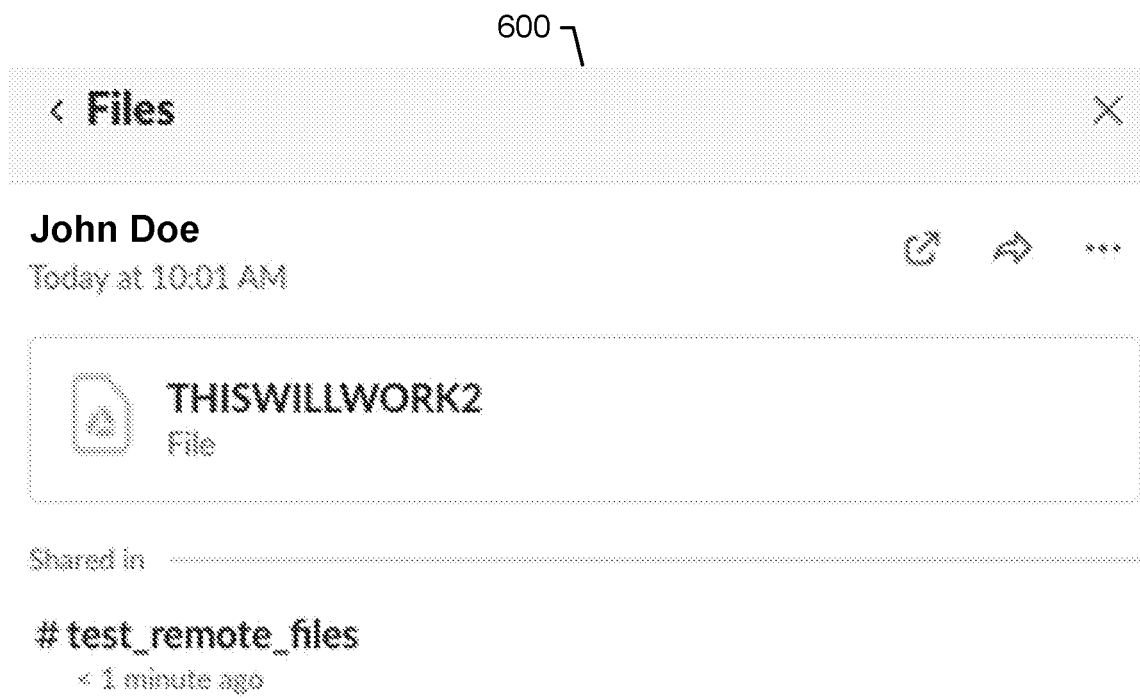

In response to adding the remote data object graphical representation to the group-based communication system 105, the communication device (e.g., apparatus 400) of the remote resource may communicate (e.g., via interface generation circuitry 409) with the share API 212 to call and execute a chat.unfurl function API of the share API 212. In response to executing the chat.unfurl function API, the communication device (e.g., apparatus 400) of the remote resource may automatically unfurl a remote data object graphical representation into a rendered Block Kit (also referred to herein as Block Kit message) user interface, as shown in the user interface 600 of FIG. 6. The communication device (e.g., apparatus 400) of the remote resource may unfurl the remote data object graphical representation in response to detecting user interaction with the remote data object graphical representation and a user identifier of the user, of the group-based communication channel, that initially posted the message including the link (e.g., a Google Drive™ file) associated with the file to the group-based communication channel. In response to identifying the group-based communication channel (e.g., channel #test_remote_files) based in part on the user identifier associated with the user of the group-based communication channel that posted the message, the communication device (e.g., apparatus 400) of the remote resource may communicate with the group-based communication server 113 to enable the group-based communication server 113 to provide (e.g., post) the rendered Block Kit user interface to the group-based communication channel (e.g., channel #test_remote_ files). In this regard, client devices (e.g., client devices 101) of users of the group-based communication channel may display (e.g., via display 310) the rendered Block Kit user interface.

Figure 7:
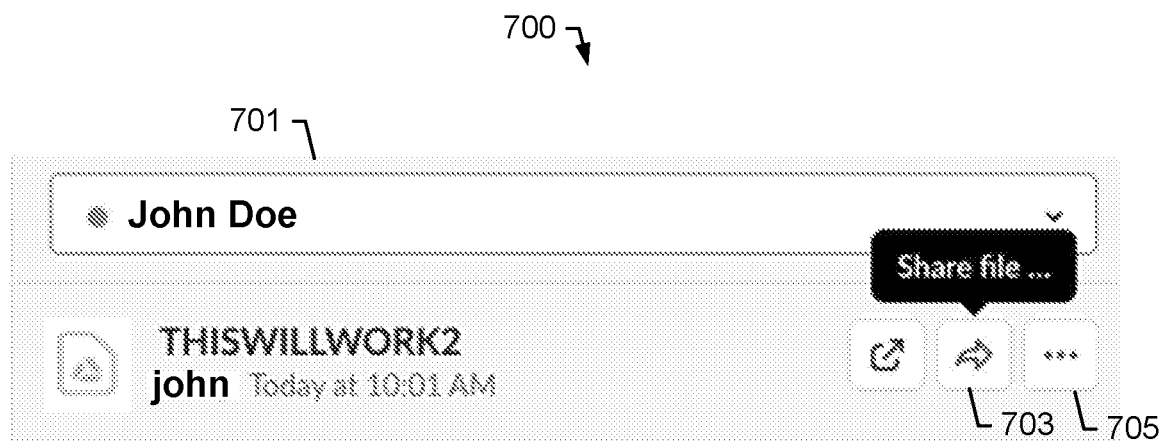
Figure 8:
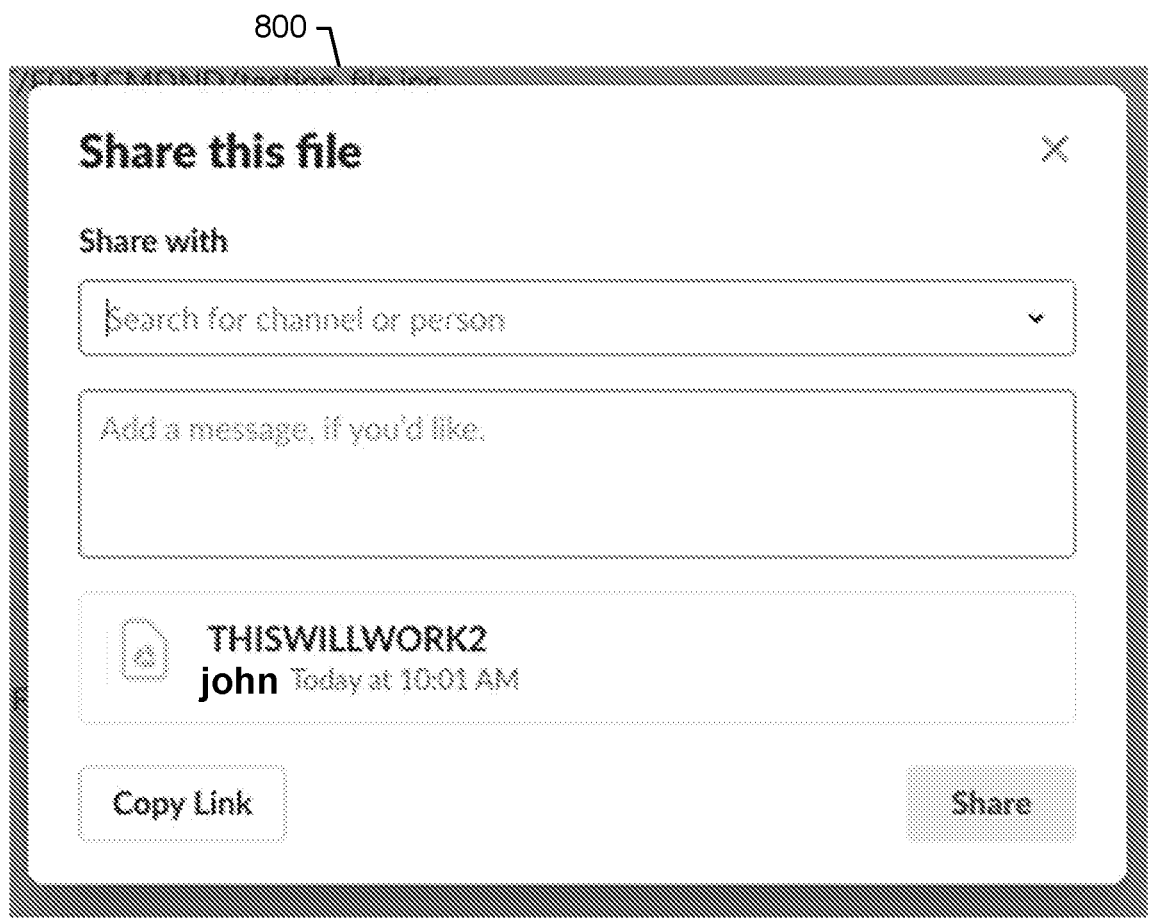

Referring now to FIG. 7, an example user interface is provided according to an exemplary embodiment. In the example of FIG. 7, in response to detection of a selection of a share file tab 703 (also referred to herein as share feature 703) from a Block Kit user interface 701, the group-based communication server 113 may generate and render a user interface 800, shown in FIG. 8, to share a pointer, a memory address or the like to a file (e.g., the file named "THISWILLWORK2") received from a remote resource (e.g., Google Drive™) to another group-based communication channel and/or user(s) (e.g., a group-based communication channel and/or user with rights to access the file) of the group-based communication system 105. In this manner, the group-based communication server 113 may re-share pointers or memory addresses to files from one group-based communication channel (e.g., channel #test_remote_files) to another group-based communication channel (e.g., channel #feat-tech-files) and/or user(s).

Figure 9:

In another example embodiment, in response to the group-based communication server 113 detecting indication of a selection of the additional feature tab 705, the group-based communication server 113 may delete a pointer or memory address to the file (e.g., the file named "THISWILLWORK2") received from the remote resource (e.g., Google Drive™) and may generate and render the user interface 900 shown in FIG. 9 including visible indicia denoting that the pointer or memory address to the file was deleted.

In an example embodiment, the group-based communication server 113, may call a resource.remote.list function API of the share API 212 and invoke/execute the resource.remote.list function API to query and retrieve all locally stored data objects (e.g., files, call objects, task objects, event objects and/or calendar objects) stored in local memory (e.g., memory 204) of the group-based communication server 113 associated with a share user identifier. The group-based communication server 113 may also call the resource.remote.list function API of the share API 212 and invoke/execute the resource.remote.list function API to query and retrieve remotely stored data objects (e.g., files, call objects, task objects, event objects and/or calendar objects) stored on a remote resource memory (e.g., memory 403) of a remote resource (e.g., Google Drive™, Dropbox™, etc.)) associated with the share user identifier. The share user identifier is associated with a group-based communication user that initiated a share request to share the locally stored data objects and the remotely stored data objects to a group-based communication interface. The group-based communication server 113 may render a user shared data object list (e.g., files, call objects, task objects, event objects and/or a calendar objects associated with the shared user identifier) to the group-based communication interface, in which the user shared data object list includes data object graphical representations associated with the locally stored data objects and the remotely stored data objects.

In an example embodiment, the group-based communication server 113 may order the user shared object list based on access recency (e.g., based on a time associated with respective share timestamps) of the locally stored data objects and the remotely stored data objects by the group-based communication user associated with the share user identifier. The more recently accessed data items may be ordered higher in the user shared object list relative to older accessed data items. In some other example embodiments, the group-based communication server 113 may order the user shared object list based on a share location identifier associated with the locally stored data objects and the remotely stored data objects. The share location identifier may identify a group-based communication channel or a direct message that the group-based communication user associated with the share user identifier most recently shared the locally stored data objects and the remotely stored data objects. In this regard, the user shared object list may be ordered with the most recent locally stored data objects and remotely stored data objects shared to a group-based communication channel or a direct message being higher in the ordered user shared object list relative to older shared locally stored data objects and remotely stored data objects.

In another example embodiment, the group-based communication server 113, may call the resource.remote.list function API of the share API 212 and invoke/execute the resource.remote.list function API to query and retrieve all locally stored data objects (e.g., files, or call objects, or task objects, or event objects, or calendar objects) stored in local memory (e.g., memory 204) of the group-based communication server 113 associated with a remote data object type identifier. The group-based communication server 113 may also call the resource.remote.list function API of the remote resource API 212 and invoke/execute the resource.remote.list function API to query and retrieve remotely stored data objects (e.g., files, or call objects, or task objects, or event objects or calendar objects) stored on a remote resource memory (e.g., memory 403) of a remote resource (e.g., Google Drive™, Dropbox™, etc.)) associated with the remote data object type identifier. The remote data object type identifier is associated with a type of the data objects (e.g., file-type, call object type, task object type, event object type, or calendar object type). The group-based communication server 113 may render a common object type list (e.g., a file object type list (in an example in which the locally and remotely stored data items are associated with files) to the group-based communication interface, wherein the common object type list includes data object graphical representations associated with the locally stored data objects and the remotely stored data objects. In an example embodiment, the group-based communication server 113 may order the common object type list based on access recency (e.g., based on a time associated with respective remote data object access timestamps) of the locally stored data objects and the remotely stored data objects. The more recently accessed data items may be ordered higher in the common object type list relative to older accessed data items. In some other example embodiments, the group-based communication server 113 may order the common object type list based on a share location identifier associated with the locally stored data objects and the remotely stored data objects. The share location identifier may identify a group-based communication channel or a direct message in which a group-based communication user most recently shared the locally stored data objects and the remotely stored data objects associated with the remote data object type identifier. In this regard, the common object type list may be ordered with the most recent locally stored data objects and remotely stored data objects shared to a group-based communication channel or a direct message being higher in the ordered common object type list relative to older shared locally stored data objects and remotely stored data objects.

Figure 10:
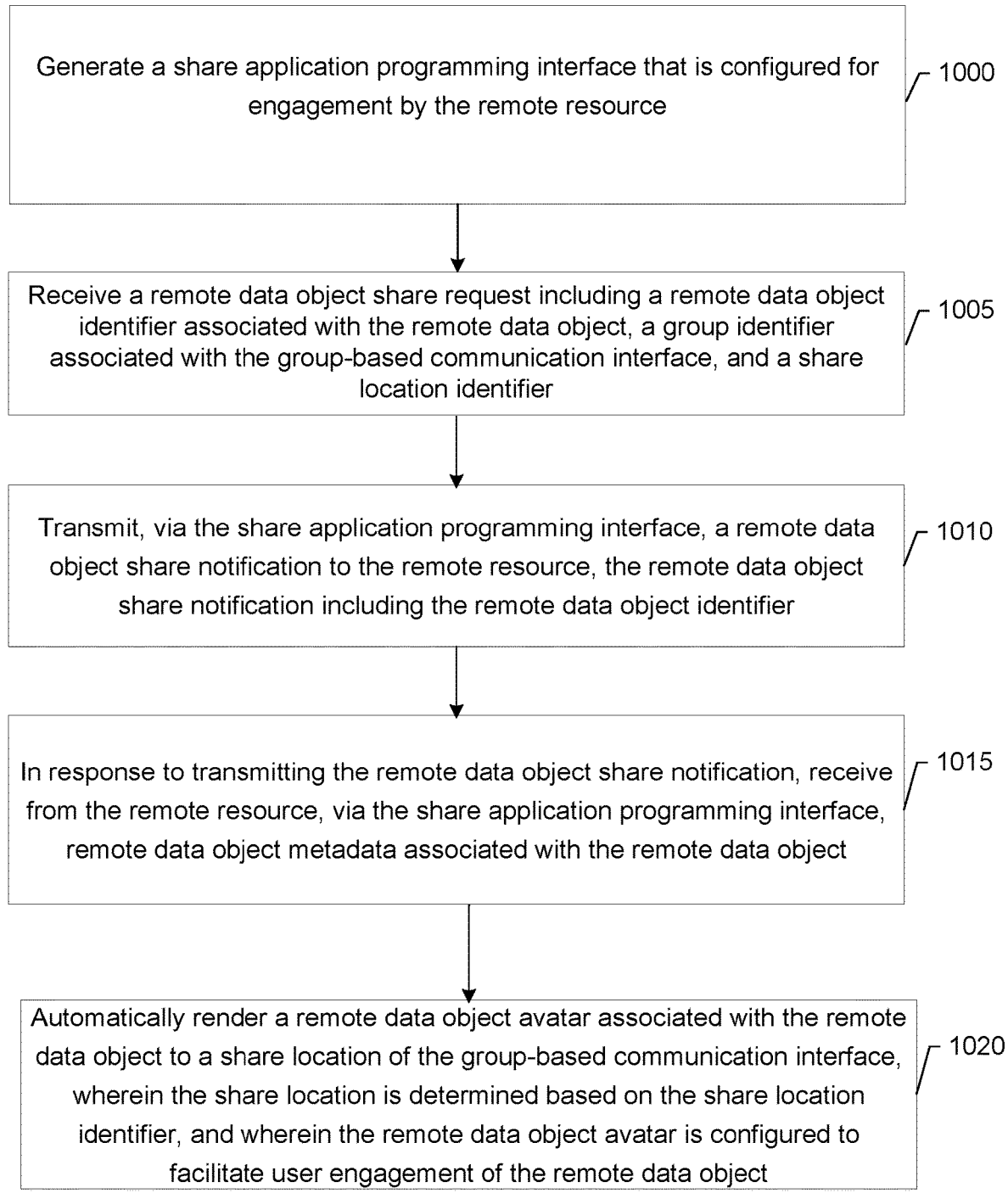
FIG. 10 is an example flowchart illustrating example methods in accordance with some exemplary embodiments of the present disclosure.

Referring now to FIG. 10, an example embodiment of a flowchart for managing communication between a remote resource, hosting a remote data object, and a group-based communication interface of a group-based communication system is provided. At operation 1000, an apparatus (e.g., group-based communication server 113) may generate a share application programming interface (e.g., share API 212, API component 117) that is configured for engagement by the remote resource (e.g., Google Drive™).

At operation 1005, an apparatus (e.g., group-based communication server 113) may receive a remote data object share request (e.g., a request generated in response to selection of the share file tab 703) including a remote data object identifier associated with the remote data object, a group identifier associated with the group-based communication interface (e.g., user interface 600), and a share location identifier (e.g., a group-based communication channel identifier or a DM identifier). In some example embodiments, the remote data object share request may also include a share user identifier associated with a group-based communication user that initiated the share request. In an example embodiment, the remote data object may be a file(s), a call object(s), a task(s), an event object(s) or a calendar object(s). At operation 1010, an apparatus (e.g., group-based communication server 113) may transmit, via the share application programming interface, a remote data object share notification to the remote resource, the remote data object share notification including the remote data object identifier.

At operation 1015, an apparatus (e.g., group-based communication server 113) may in response to transmitting the remote data object share notification, receive from the remote resource, via the share application programming interface, remote data object metadata associated with the remote data object. In one example embodiment, the remote data object metadata may include a remote data object graphical representation (e.g., in which a remote resource may subsequently unfurl), the name of the remote data object, the size of the remote data object, a remote data object type identifier, and any other suitable remote data object metadata. At operation 1020, an apparatus (e.g., group-based communication server 113) may automatically render a remote data object graphical representation associated with the remote data object to a share location (e.g., the group-based communication channel associated with the group-based communication channel identifier or the DM associated with the DM identifier) of the group-based communication interface, wherein the share location is determined based on the share location identifier, and wherein the remote data object graphical representation is configured to facilitate user engagement of the remote data object.

Figure 11:
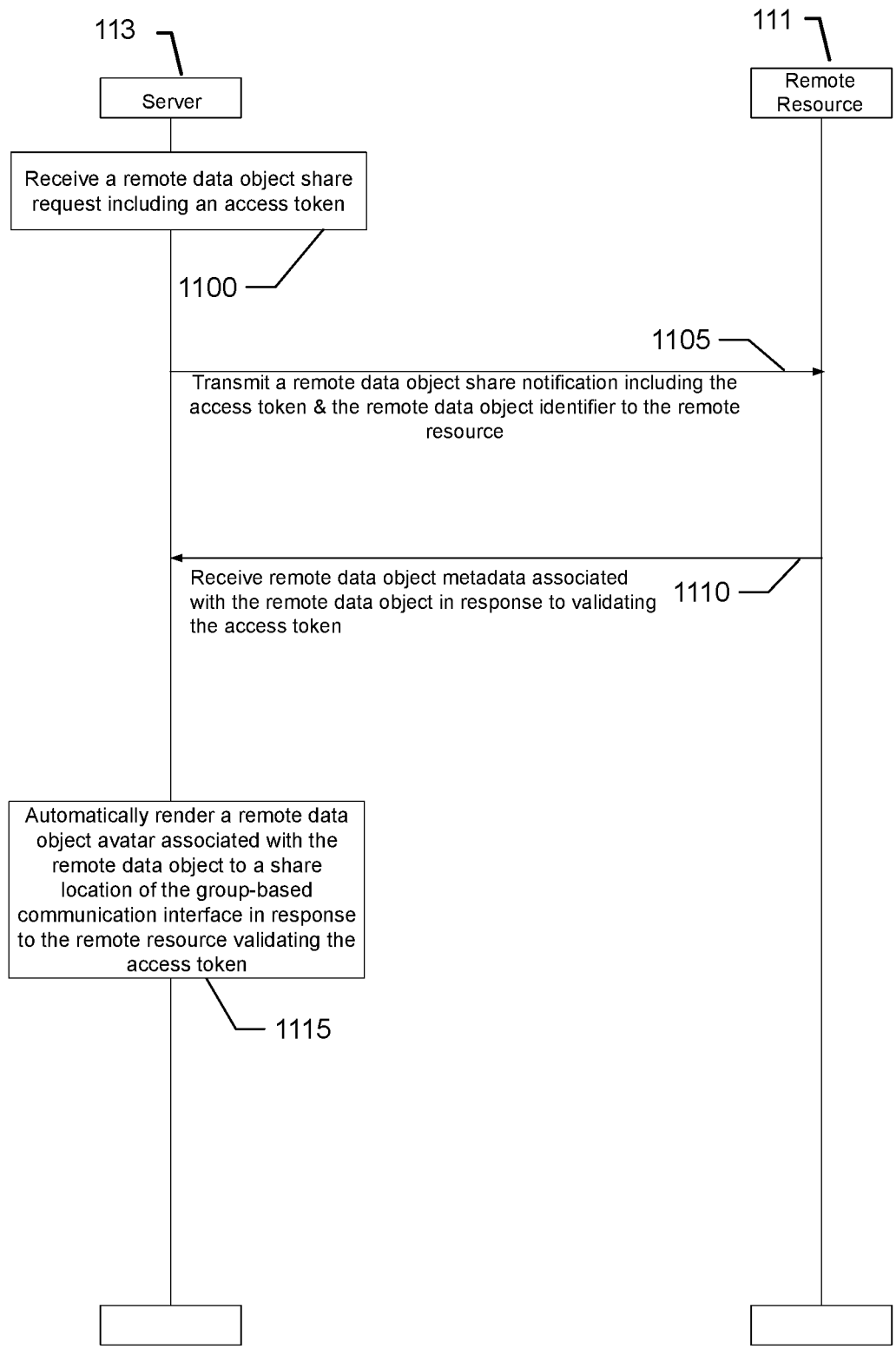
FIG. 11 is a signal diagram illustrating example methods in accordance with some exemplary embodiments of the disclosure.

Referring now to FIG. 11, an example embodiment of a signal diagram for managing authenticated communication between a remote resource 111, hosting a remote data object, and a group-based communication interface of a group-based communication system is provided. At operation 1100, an apparatus (e.g., group-based communication server 113) may receive a remote data object share request via a group-based communication interface (e.g., user interface 600). The remote data object share request may include an authentication token (e.g., an OAuth token), a remote data object identifier associated with a remote data object, a group identifier associated with the group-based communication interface and a share location identifier. The remote data object may be a file(s), a call object(s), a task(s), an event object(s) or a calendar object(s).

In an example embodiment, the authentication token may authorize a remote resource 111 hosting/storing the remote data object to communicate with the group-based communication system 105 (e.g., access a pointer and/or a memory address or the like to one or more group-based communication channels or one or more DM users that a client device of a user initiating the remote data object share request is authorized to access).

At operation 1105, an apparatus (e.g., group-based communication server 113) may transmit, via a share application programming interface, a remote data share notification to the remote resource 111 (e.g., via a network application server 109 of a remote resource). The remote data object share notification includes the authentication token and the remote data object identifier. At operation 1110, an apparatus (e.g., group-based communication server 113) may receive from the remote resource 111 (e.g., via a network application server 109 of a remote resource 111), via the share application programming interface, remote data object metadata associated with the remote data object in response to the remote resource 111 validating the authentication token.

At operation 1115, an apparatus (e.g., group-based communication server 113) may automatically render a remote data object graphical representation associated with the remote data object to a share location of the group-based communication interface. The share location is determined based on the share location identifier and in response to the remote resource 111 validating the authentication token. The remote data object graphical representation is configured to facilitate user engagement of the remote data object.

Figure 12:
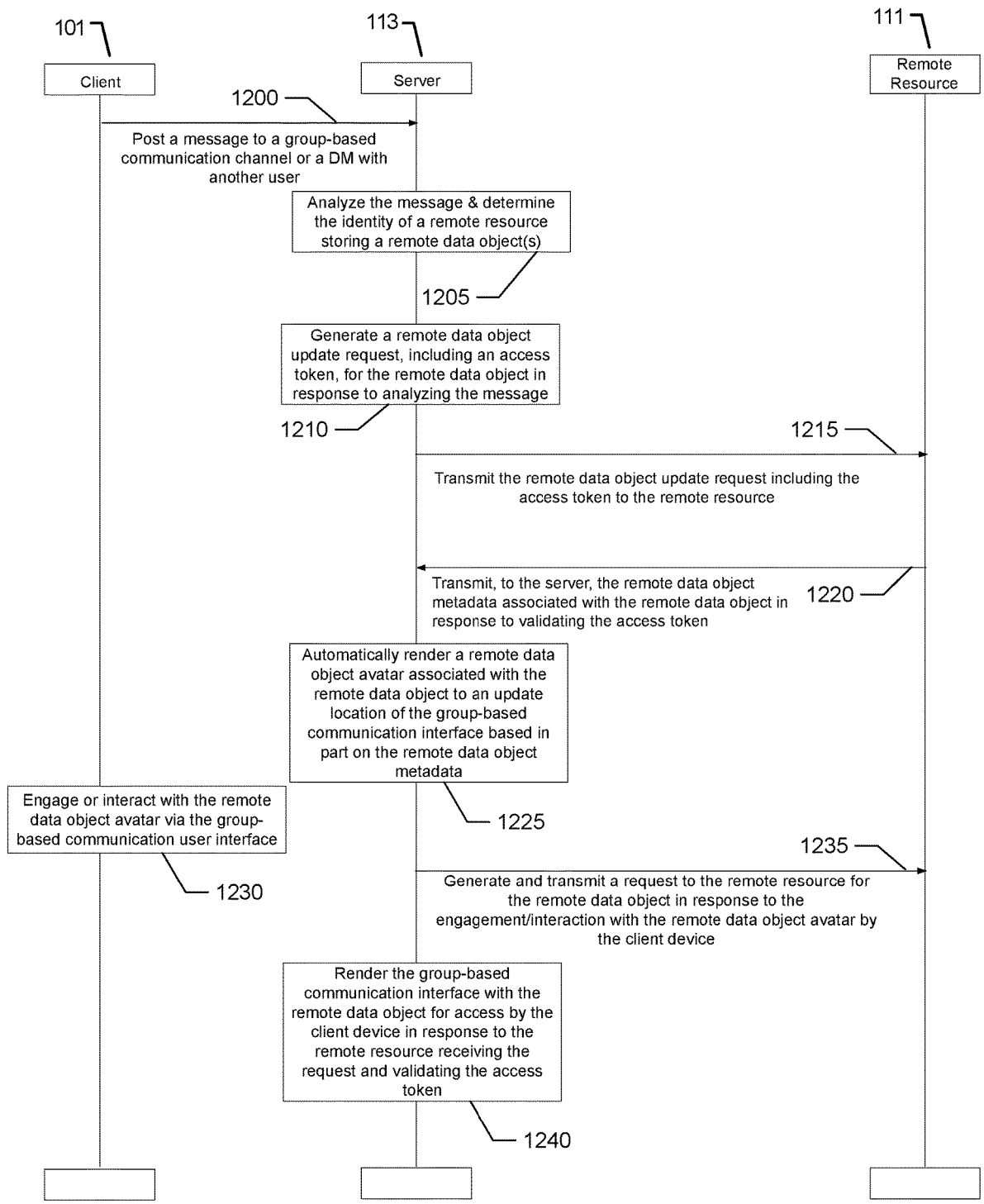
FIG. 12 is another signal diagram illustrating example methods in accordance with some exemplary embodiments of the disclosure.

Referring now to FIG. 12, another example embodiment of a signal diagram for managing authenticated communication between a remote resource 111, hosting a remote data object, and a group-based communication interface of a group-based communication system is provided. At operation 1200, a client device (e.g., client device 101) of a user posts a message (e.g., including a link (e.g., a URL)) to a group-based communication channel or a direct message with another user in which the message is associated with a remote data object stored by a remote resource 111.

At operation 1205, an apparatus (e.g., the group-based communication server 113) may analyze the message and determine the identity (e.g., based on the domain of the URL) of the remote resource 111. At operation 1210, the apparatus (e.g., the group-based communication server 113) may generate a remote data object update request for the remote data object in response to analyzing the posted message. In an example embodiment, the remote data update request may include an authentication token (e.g., an OAuth token), a remote data object identifier associated with the remote data object, and a group identifier associated with the group-based communication interface and an update location identifier. The authentication token may authorize the remote resource 111 hosting/storing the remote data object to communicate with the group-based communication system 105 (e.g., access a pointer and/or a memory address or the like to one or more group-based communication channels or one or more DM users that the client device of the user is authorized to access).

At operation 1215, an apparatus (e.g., group-based communication server 113) may transmit, via an application programming interface (e.g., share API 212, API component 117), the remote data object update request to the remote resource 111. At operation 1220, an apparatus (e.g., group-based communication server 113) may receive from the remote resource 111, via the application programming interface, remote data object metadata associated with the remote data object in response to transmitting the remote data object update request and in response to the remote resource 111 validating the authentication token.

At operation 1225, an apparatus (e.g., group-based communication server 113) may render a remote data object graphical representation associated with the remote data object to an update location (e.g., a group-based communication channel, a DM with another user) of a group-based communication interface based in part on the remote data object metadata. The update location may be determined based on the update location identifier. The remote data object graphical representation is accessible by a client device (e.g., client device 101) of a user.

At operation 1230, the client device (e.g., client device 101) of the user is configured to engage or interact with the remote data object graphical representation. At operation 1235, an apparatus (e.g., group-based communication server 113) may generate and transmit a request to the remote resource 111 for a preview image (e.g., a preview image object) of the remote data object in response to the engagement/interaction with the remote data object graphical representation by the client device. At operation 1240, an apparatus (e.g., group-based communication server 113) may render the group-based communication interface with the preview image of remote data object for interaction or access by the client device in response to the remote resource 111 receiving the request from the apparatus and validating the authentication token.

Figure 13:
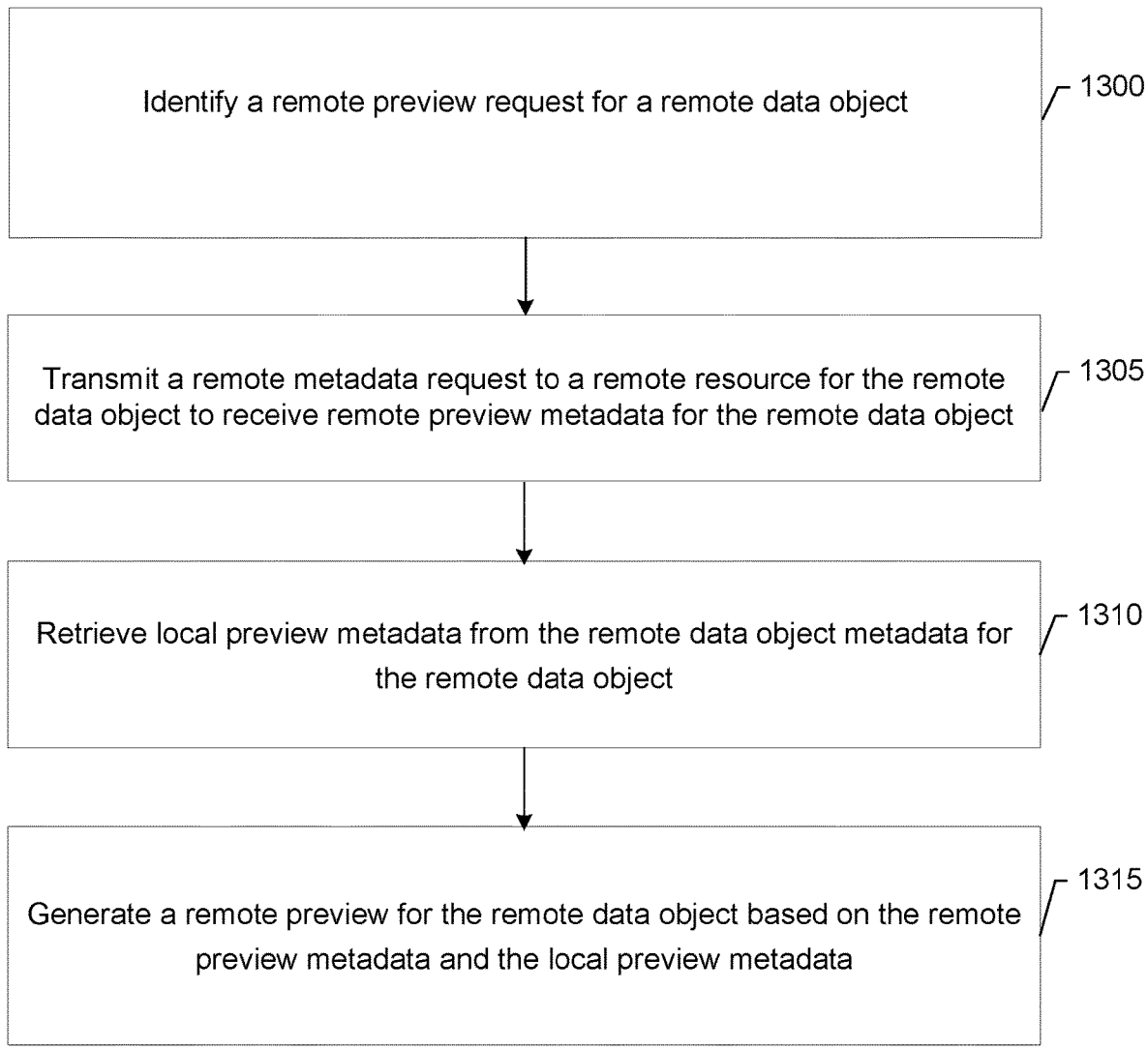
FIGS. 13-14 are example flowcharts illustrating example methods in accordance with some exemplary embodiments of the present disclosure.

Referring now to FIG. 13, a flowchart diagram of an example method for generating a remote preview for a remote data object is presented. The example method may be utilized to generate remote previews for remote data objects in accordance with different properties of the remote data objects and/or different properties of preview-requesting user profiles. For example, because members of a group-based communication channel may have different access rights to a remote data object, an apparatus (e.g., group-based communication server 113) may generate a particular access-rights-adjusted remote preview (e.g., a pre-selected preview defined by a creator user profile for the remote data object, a preview generated by a remote resource associated with the remote data object, a preview generated based on access rights of a preview-requesting user profile, etc.) in accordance with the particular access rights parameters of the remote data object. Aspects of the proposed techniques described in the example method may enhance efficiency and reliability of access control management for remote data objects in group-based communication systems as well as enhance security and privacy features of group-based communication systems.

At operation 1300, an apparatus (e.g., group-based communication server 113) identifies a remote data preview request for a remote data object. For example, the apparatus may identify that an end user profile of the group-based communication system 105 has performed an action configured to request a remote preview for the remote data object. Examples of suitable actions may include hovering a pointer over a remote data object graphical representation for the remote data object, pressing a key combination configured to request a remote preview for the remote data object, performing a touch pattern (e.g., a two-finger expansion touch pattern and/or a two-finger minimization touch pattern) configured to request a remote preview for the remote data object, performing a right click over a remote data object graphical representation for the remote data object, etc.

At operation 1305, an apparatus (e.g., group-based communication server 113) transmits a remote metadata request to a remote resource for the remote data object to receive remote preview metadata for the remote data object. The remote preview metadata may include at least one of one or more access security policies for the remote data object, an interactive preview of the remote data object, an indexed version of the remote data object, etc. For example, the remote resource may identify that particular portions of the remote data object are access-restricted and generate, as at least a part of the remote preview metadata, an interactive preview of the remote data object that does not include such particular portions. In some embodiments, the remote preview metadata may indicate that no preview-related information are available for the remote data object.

At operation 1310, an apparatus (e.g., group-based communication server 113) retrieves local preview metadata for the remote data object from the remote object metadata for the remote data object. In some embodiments, the remote object metadata for the remote data object includes information (e.g., an indexed version of the remote data object) that can be used to generate the remote preview of the remote data object. In some embodiments, at least some of the information retrieved as local preview metadata in operation 1310 depend at least in part on at least some of the information received as remote preview metadata in operation 1305. For example, if the remote preview metadata indicate absence of access control restrictions for a remote data object, the apparatus may use all of the remote object metadata for the remote data object to generate the remote preview for the remote data object; on the other hand, if the remote preview metadata indicate presence of access control restrictions for a remote data object, the apparatus may use only portions of the remote data object metadata for the remote data object deemed non-confidential (e.g., an indexed version of the remote data object) to generate a remote preview for the remote data object. In some embodiments, if the remote preview metadata includes an interactive preview of the remote data object, the apparatus will not retrieve the local preview metadata and will instead use the interactive preview to generate the remote preview of the remote data object.

At operation 1315, an apparatus (e.g., group-based communication server 113) generates a remote preview for the remote data object based on the remote preview metadata for the remote data object and the local preview metadata for the remote data object. In some embodiments, in response to determining that the remote preview metadata for a remote data object includes an interactive preview of the remote data object, the apparatus determines the remote preview based on the interactive preview. In some embodiments, in response to determining that the remote preview metadata for a remote data object indicates presence of access controls for the remote data object, the apparatus determines the remote preview based on portions of the remote data object metadata for the remote data object deemed non-confidential (e.g., an indexed version of the remote data object). In some embodiments, in response to determining that the remote preview metadata for a remote data object indicates absence of access controls for the remote data object, the apparatus determines the remote preview based on all portions of the remote object metadata object for the remote data object. In some embodiments, in response to determining that the remote preview metadata for a remote data object indicates particular access control restrictions for the remote data object, the apparatus filters the information in the remote data object metadata for the remote data object to determine information suitable to generate the remote preview for the remote data object.

Figure 15:
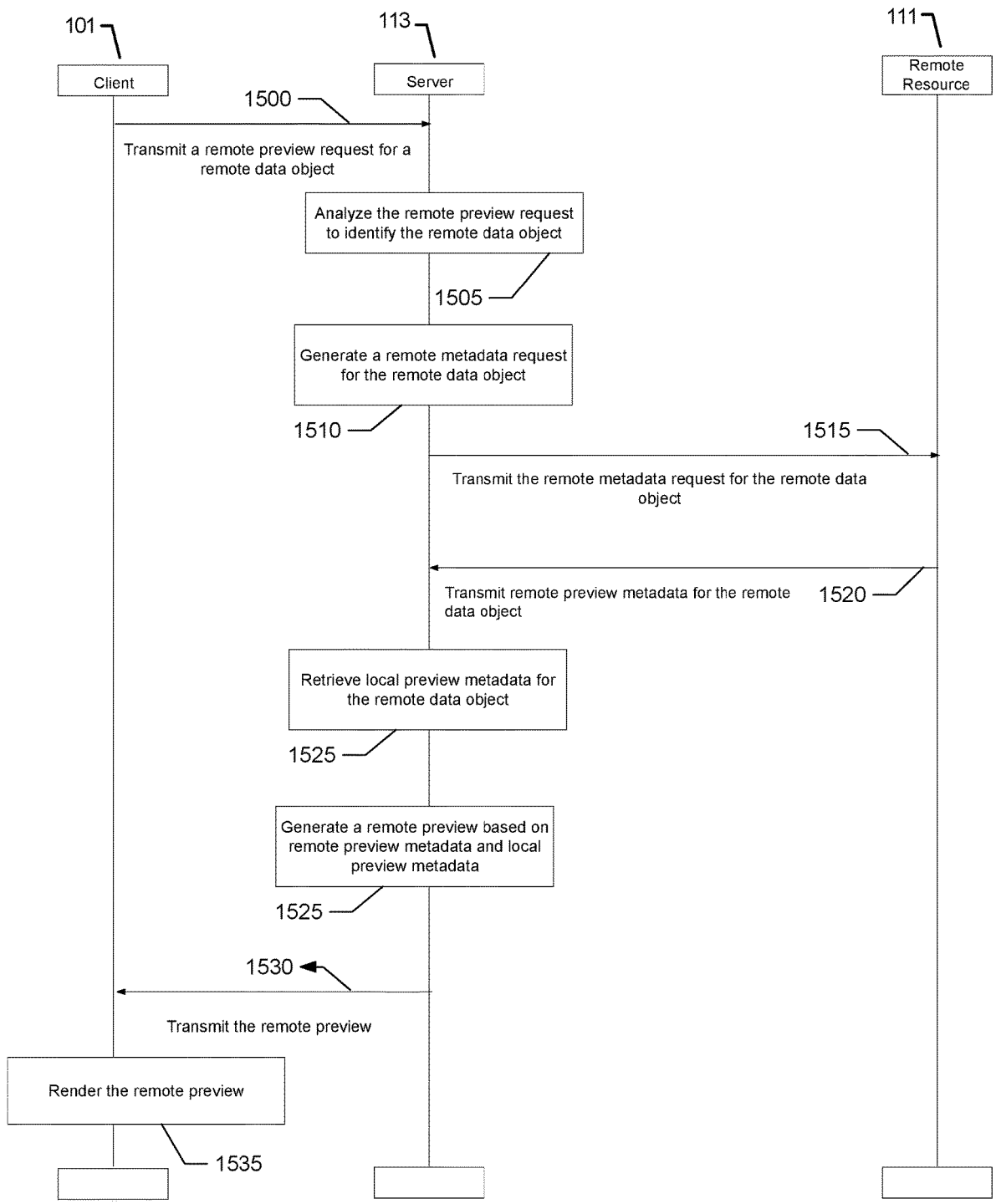
FIG. 15 is another signal diagram illustrating example methods in accordance with some exemplary embodiments of the disclosure.

Referring now to FIG. 15, a signal diagram of an example method for generating and rendering a remote preview for a remote data object is presented. At operation 1500, a client device (e.g., client device 101) transmits a remote preview request for a remote data object to a server device (e.g., the group-based communication server 113). At operation 1505, the server device analyzes the remote preview request to identify the remote data object. At operation 1510, the server device generates a remote metadata request for the remote data object. At operation 1515, the server device transmits the remote metadata request for the remote data object to a remote resource 111 associated with the remote data object. At operation 1520, the remote resource 111 transmits remote preview metadata for the remote data object to the server device. At operation 1525, the server device retrieves local preview metadata for the remote data object. At operation 1525, the server device generates a remote preview for the remote data object based on the remote preview metadata for the remote data object and the local preview metadata for the remote data object. At operation 1530, the server device transmits the remote preview to the client device. At operation 1535, the client device renders the remote preview.

Figure 14:
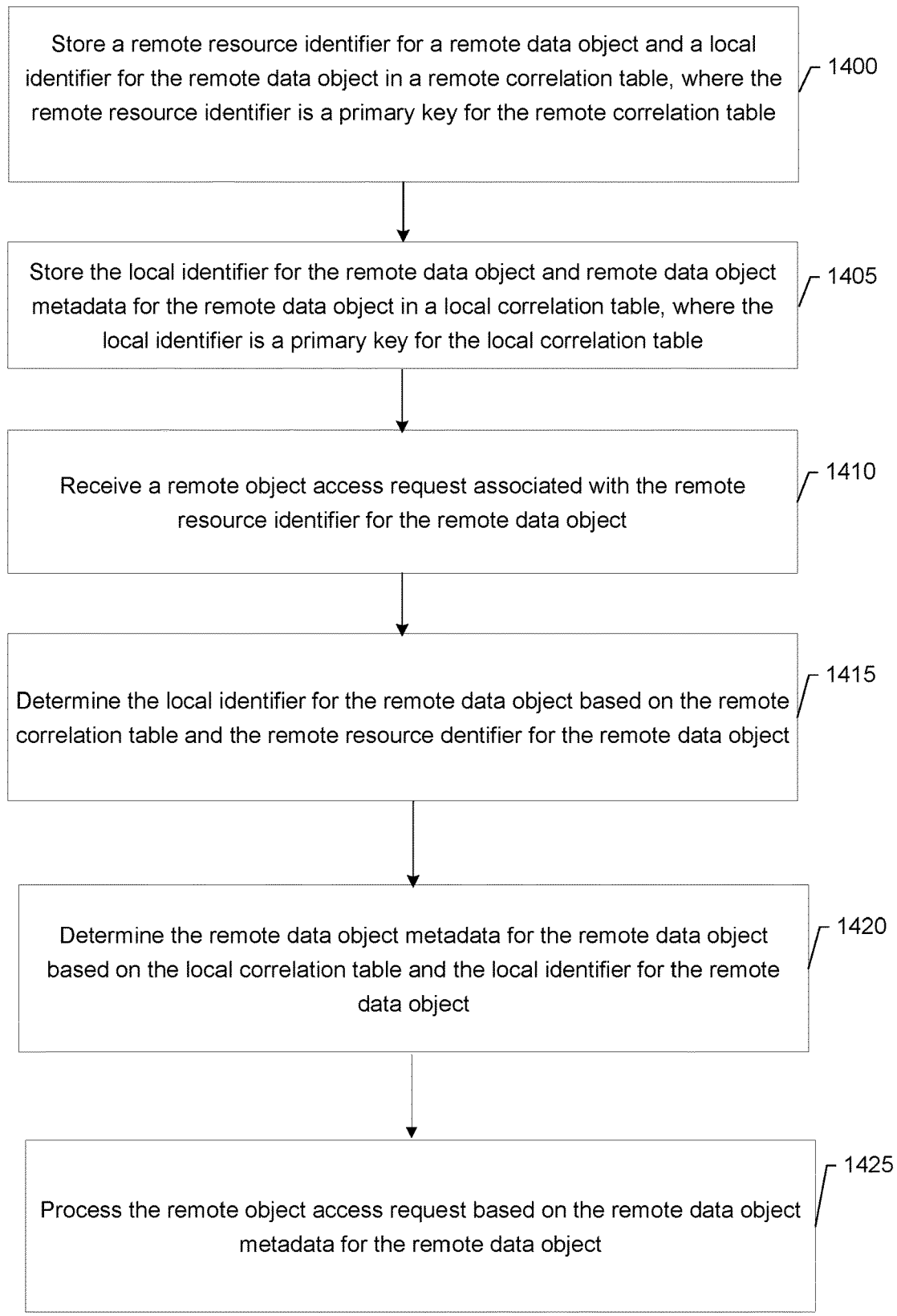

Referring now to FIG. 14, a flowchart diagram of an example method for processing a remote object access request based on a remote data object identifier for a remote data object is presented. The example method may be especially suitable for maintaining two or more data object identifiers for the same remote data objects (e.g., for storing associations between remote-resource-side identifiers for remote data objects and group-based-system-side identifiers for remote data objects) when remote object metadata for remote data objects are stored in structured formats that limit the number of available primary key fields. In such contexts, utilizing the indirect lookup techniques disclosed by aspects of the example method may reduce storage costs associated with metadata database storage, decrease computational costs of metadata database retrieval, and increase scalability and reusability of metadata databases.

At operation 1400, an apparatus (e.g., group-based communication server 113) stores a remote resource identifier for a remote data object and a local identifier for the remote data object in a remote correlation table, where the remote data object identifier is a primary key for the remote correlation table. In some embodiments, the local identifier for the remote data object is not a primary key for the remote correlation table. The remote correlation table may be a table in a relational database (e.g., a SQL database) and/or a file in a structured-file-based database (e.g., a JSON database).

At operation 1405, an apparatus (e.g., group-based communication server 113) stores a local identifier for the remote data object and remote data object metadata for the remote data object in a local correlation table, where the local identifier is a primary key for the local correlation table. The local correlation table may be a table in a relational database (e.g., a SQL database) and/or a file in a structured-file-based database (e.g., a JSON database).

At operation 1410, an apparatus (e.g., group-based communication server 113) receives a remote object access request associated with the remote data object identifier for the remote data object. In some embodiments, the remote object access request is a request to search information (e.g., remote object metadata information) associated with the remote data object. In some embodiments, the remote data object request is a request to view contents of the remote data object. In some embodiments, the remote data object request is a request to modify contents of the remote data object. In some embodiments, the remote data object request is a request to delete the remote data object. In some embodiments, the remote data object request is a request to change a property (e.g., an access restriction parameter, an address, etc.) of the remote data object. In some embodiments, the remote object access request includes the remote resource identifier for the remote data object.

At operation 1415, an apparatus (e.g., group-based communication server 113) determines the local identifier for the remote data object based on the remote correlation table and the remote data object identifier for the remote data object. In some embodiments, the apparatus performs a reverse lookup of the remote correlation table using the remote resource identifier as the primary key to identify a remote correlation table entry associated with the remote resource identifier and then retrieves the local identifier associated with the particular remote correlation table entry.

At operation 1420, an apparatus (e.g., group-based communication server 113) determines the remote data object metadata for the remote data object based on the local correlation table and the local identifier for the remote data object. In some embodiments, the apparatus performs a reverse lookup of the local correlation table using the local identifier for the remote data object as the primary key to identify a local correlation table entry associated with the local identifier and then retrieves the remote data object metadata associated with the particular remote correlation table entry.

At operation 1425, an apparatus (e.g., group-based communication server 113) processes the remote object access request for the remote object based on the remote data object metadata for the remote data object. In some embodiments, the apparatus performs a desired action indicated by the remote object access request based on the remote data object metadata. For example, if the desired action is to retrieve a remote data object having a particular remote data object identifier, the apparatus may retrieve the remote data object and present it as a search result using a search result interface. As another example, if the desired action is to modify a remote data object having a particular remote data object identifier, the apparatus may modify the remote data object as requested and/or transmit a request for modification of the remote data object to a remote resource associated with the particular data object. As a further example, if the desired action is to delete a remote data object having a particular remote data object identifier, the apparatus may delete the remote data object as requested and/or transmit a request for deletion of the remote data object to a remote resource associated with the particular data object.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page and/or image data for a remote preview) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A method of communicating with a remote resource to present a graphical representation of a remote data object in a group-based communication interface, the method comprising:
  receiving, via a group-based communication system, the remote data object share request comprising:
    a uniform resource locator (URL) indicative of the remote data object stored at the remote resource;
    a share location identifier identifying a share location within the group-based communication interface; and
    a group identifier identifying a set of users having access to the share location within the group-based communication interface, the set of users being a subset of a group having access to the group-based communication interface;
  transmitting the remote data object share notification to the remote resource;
  receiving, from the remote resource, data indicative of the graphical representation of the remote data object; and
  causing display of the graphical representation of the remote data object at the share location within the group-based communication interface for view by the set of users identified by the group identifier.

2. The method of claim 1, wherein the share location is one of a group-based communication channel or a direct message interface.

3. The method of claim 1, wherein the group identifier is a workspace identifier within the group-based communication system.

4. The method of claim 1, wherein the remote data object share notification, transmitted to the remote resource, comprises an authentication token authorizing the remote resource to communicate with the group-based communication system.

5. The method of claim 4, further comprising enabling user access to the remote data object in response to the remote resource validating the authentication token.

6. The method of claim 1, further comprising:
receiving, from the remote resource, remote preview metadata for the remote data object;
generating, based on the remote preview metadata, a remote preview, and
automatically rendering the remote preview in response to a remote preview request.

7. The method of claim 6, wherein the remote preview comprises image data or remote preview markup data.

8. One or more non-transitory computer-readable media storing computer-executable instructions that, when executed by a processor, perform a method of communicating with a remote resource to present a graphical representation of a remote data object in a group-based communication interface, the method comprising:
receiving, via a group-based communication system, the remote data object share request comprising:
a uniform resource locator (URL) indicative of the remote data object stored at the remote resource;
a share location identifier identifying a share location within the group-based communication interface; and
a group identifier identifying a set of users having access to the share location within the group-based communication interface, the set of users being a subset of a group having access to the group-based communication interface;
transmitting the remote data object share notification to the remote resource;
receiving, from the remote resource, data indicative of the graphical representation of the remote data object; and
causing display of the graphical representation of the remote data object at the share location within the group-based communication interface for view by the set of users identified by the group identifier.

9. The media of claim 8, wherein the share location is one of a group-based communication channel or a direct message interface.

10. The media of claim 8, wherein the group identifier is a workspace identifier within the group-based communication system.

11. The media of claim 8, wherein the remote data object share notification, transmitted to the remote resource, comprises an authentication token authorizing the remote resource to communicate with the group-based communication system.

12. The media of claim 11, wherein the method further comprises enabling user access to the remote data object in response to the remote resource validating the authentication token.

13. The media of claim 8, wherein the method further comprises:
receiving, from the remote resource, remote preview metadata for the remote data object;
generating, based on the remote preview metadata, a remote preview, and
automatically rendering the remote preview in response to a remote preview request.

14. The media of claim 13, wherein the remote preview comprises image data or remote preview markup data.

15. A system comprising at least one processor and one or more non-transitory computer-readable media storing computer-executable instructions that, when executed by the at least one processor, perform a method of communicating with a remote resource to present a graphical representation of a remote data object in a group-based communication interface, the method comprising:
receiving, via a group-based communication system, the remote data object share request comprising:
a uniform resource locator (URL) indicative of the remote data object stored at the remote resource;
a share location identifier identifying a share location within the group-based communication interface; and
a group identifier identifying a set of users having access to the share location within the group-based communication interface, the set of users being a subset of a group having access to the group-based communication interface;
transmitting the remote data object share notification to the remote resource;
receiving, from the remote resource, data indicative of the graphical representation of the remote data object; and
causing display of the graphical representation of the remote data object at the share location within the group-based communication interface for view by the set of users identified by the group identifier.

16. The system of claim 15, wherein the share location is one of a group-based communication channel or a direct message interface.

17. The system of claim 16, wherein the group identifier is a workspace identifier within the group-based communication system.

18. The system of claim 15,
wherein the remote data object share notification, transmitted to the remote resource, comprises an authentication token authorizing the remote resource to communicate with the group-based communication system; and
further comprising facilitating user engagement of the remote data object in response to the remote resource validating the authentication token.

19. The system of claim 15, further comprising:
receiving, from the remote resource, remote preview metadata for the remote data object;
generating, based on the remote preview metadata, a remote preview, and
automatically rendering the remote preview in response to a remote preview request.

20. The system of claim 19, wherein the remote preview comprises image data or remote preview markup data.

* * * * *